United States Patent [19]

Kim et al.

[11] Patent Number: 4,895,421

[45] Date of Patent: * Jan. 23, 1990

[54] DYNAMIC COUPLERS USING TWO-MODE OPTICAL WAVEGUIDES

[75] Inventors: Byoung Y. Kim, Menlo Park; Hee G. Park, Sunnyvale; Herbert J. Shaw, Stanford, all of Calif.

[73] Assignee: The Board of Trustees of the Leland Stanford Junior University, Stanford, Calif.

[*] Notice: The portion of the term of this patent subsequent to May 3, 2005 has been disclaimed.

[21] Appl. No.: 189,050

[22] Filed: May 2, 1988

Related U.S. Application Data

[63] Continuation-in-part of Ser. No. 17,762, Feb. 20, 1987, Pat. No. 4,741,586.

[51] Int. Cl.$^4$ ............................................... G02B 6/26
[52] U.S. Cl. ............................... 350/96.15; 350/96.29
[58] Field of Search ............... 350/96.10, 96.12, 96.13, 350/96.14, 96.15, 96.16, 96.29, 96.30

[56] References Cited

U.S. PATENT DOCUMENTS

| | | | |
|---|---|---|---|
| 4,669,814 | 6/1987 | Dyott | 350/96.15 |
| 4,679,894 | 7/1987 | Pavlath | 350/96.15 |
| 4,741,586 | 5/1988 | Kim et al. | 350/96.15 |

OTHER PUBLICATIONS

Stephen R. Friberg, et al., "Nonlinear Optical Glasses for Ultrafast Optical Switches", *IEEE Journal of Quantum Electronics*, vol. QE-23, No. 12, Dec. 1987, pp. 2089-2094.

B. Y. Kim, et al., "All-Fiber Acousto-Optic Frequency Shifter," *Optics Letters*, vol. 11, No. 6, Jun. 1986, pp. 389-391.

W. V. Sorin, et al., "Highly Selective Evanescent Modal Filter for Two-Mode Optical Fibers," *Optics Letter*, vol. 11, No.9, Sep. 1986, pp. 581-583.

J. M. Dziedzic, et al., "Optical Kerr Effect in Long Fibers," *Applied Optics*, vol. 20, No. 8, Apr. 15, 1981, pp. 1403-1406.

J. N. Blake, et al., "All-Fiber Acousto-Optical Frequency Shifter Using Two-Mode Fiber," Proceedings of the SPIE, vol. 719, 1986, pp. 92-100.

J. N. Blake, et al., "Fiber-Optic Modal Coupler Using Periodic Microbending," *Optics Letters*, vol. 11, No. 3, Mar. 1986, pp. 177-179.

Allan W. Snyder, et al., "Optical Fibers of Arbitrary Cross Sections," *Journal of the Optical Society of America A*, vol. 3, No. 5, May 1986, pp. 600-609.

S. Gloge, "Weakly Guiding FIbers," *Applied Optics*, vol. 10, No. 10, Oct. 1971, pp. 2252-2258.

(List continued on next page.)

*Primary Examiner*—John D. Lee
*Assistant Examiner*—Akm E. Ullah
*Attorney, Agent, or Firm*—Knobbe, Martens, Olson & Bear

[57] ABSTRACT

An optical mode coupling apparatus includes an optical waveguide in which an optical signal at a signal wavelength propagates in a first spatial propagation mode and a second spatial propagation mode of the waveguide. The optical signal propagating in the waveguide has a beat length. The coupling apparatus includes a source of perturbational light signal at a perturbational wavelength that propagates in the waveguide in the first spatial propagation mode. The perturbational signal has a sufficient intensity distribution in the waveguide that it causes a perturbation of the effective refractive index of the first spatial propagation mode of the waveguide in accordance with the optical Kerr effect. The perturbation of the effective refractive index of the first spatial propagation mode of the optical waveguide causes a change in the differential phase delay in the optical signal propagating in the first and second spatial propagation modes. The change in the differential phase delay is detected as a change in the intensity distribution between two lobes of the optical intensity distribution pattern of an output signal. The perturbational light signal can be selectively enabled and disabled to selectively change the intensity distribution in the two lobes of the optical intensity distribution pattern.

30 Claims, 9 Drawing Sheets

OTHER PUBLICATIONS

R. C. Youngquist, et al., "Two-Mode Fiber Modal Coupler," *Optics Letters,* vol. 9, No. 5, May 1984, pp. 177–179.

R. C. Youngquist, et al., "All-Fiber Components Using Periodic Coupling," *IEEE Proceedings,* vol. 132, Pt. J, No. 5, Oct. 1985, pp. 277–286.

R. H. Stolen, et al., "Intensity Discrimination of Optical Pulses With Birefringent Fibers", Optic Letters, vol. 7, No. 10, Oct. 1982, pp. 512–514.

J. N. Blake, et al., "Strain Effects on Highly Elliptical Core Two-Mode Fibers", Optics Letter, vol. 12, No. 9 Sep. 1987, pp. 732–734.

B. Y. Kim, et al., "Use of Highly Elliptical Core Fibers for Two-Mode Fiber Devices", Optics Letters, vol. 12, No. 9, Sep. 1987, pp. 729–731.

Ulrich et al., "Polarization Optics of Twisted Single-Mode Fibers", Applied Optics, vol. 18, No. 13, Jul. 1, 1979, pp. 2241–2251.

Hill et al., "Sensitivity in Optical Fiber Waveguides: Application to Reflection Filter Fabrication", Applied Physics Letters, vol. 32, pp. 647–649, 1978.

Stegman et al., "Third Order Nonlinear Integrated Optics", Journal of Lightwave Technology, vol. 6, No. 6, Jun. 1988, pp. 953–970.

Stolen et al., "Self-Phase-Modulation in Silica Optical Fibers", Physical Review A, vol. 17, No. 4, Apr. 1978, pp. 1448–1453.

T. Morioka, et al., "Ultrafast Optical Multi/demultiplexer Utilizing Optical Kerr Effect in Polarisation-Maintaining Single-Mode Fibers," *Electronics,* Feb. 2, 1987.

N. J. Halas, et al., "Ultrafast Light-Controlled Optical-Fiber Modulator," *Applied Physics Letters,* vol. 50, No. 14, Apr. 6, 1987, pp. 886–888.

S. R. Friberg, et al., "Ultrafast All-Optical Switching in a Dual-Core Fiber Nonlinear Coupler," *Applied Physics Letters,* vol. 51, No. 15, Oct. 12, 1987, pp. 1135–1137.

R. Stolen, et al., "Parametric Amplification and Frequency Conversion in Optical Fibers," *IEEE Journal of Quantum ELectronics,* vol. QE-18, No. 7, Jul. 1982, pp. 1062–1072.

S. Jensen, "The Nonlinear Coherent Coupler," *IEEE Journal of Quantum Electronics,* vol. QE-18, No. 10, Oct. 1982, pp. 1580–1583.

S. Trillo, et al., "Experimental Observation of Polarization Instability in a Birefringent Optical Fiber," *Applied Physics Letters,* 49 (19), Nov. 10, 1986, pp. 1224–1226.

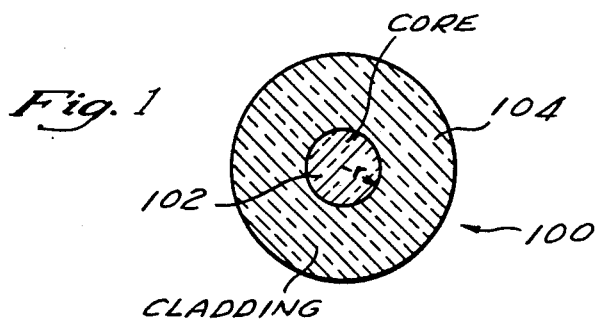
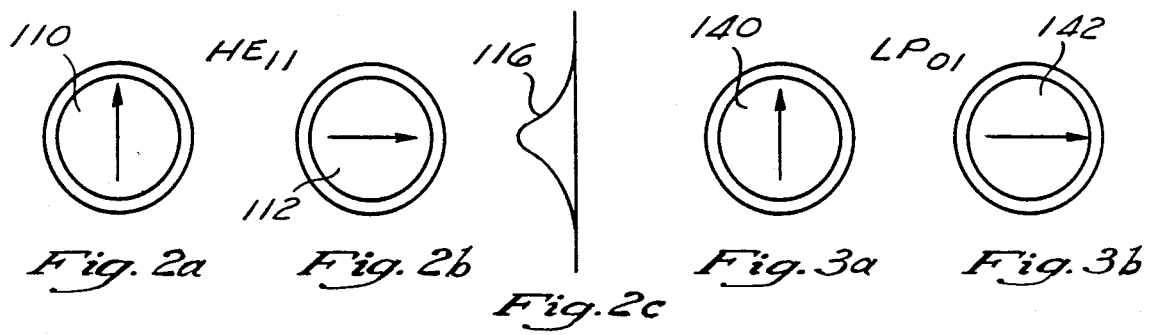
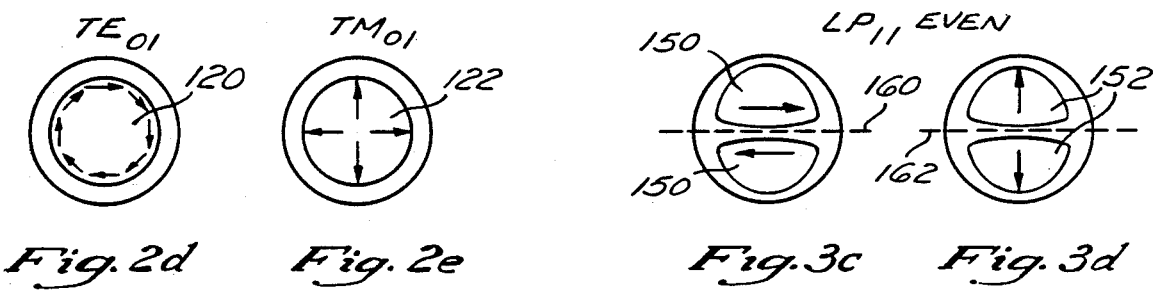
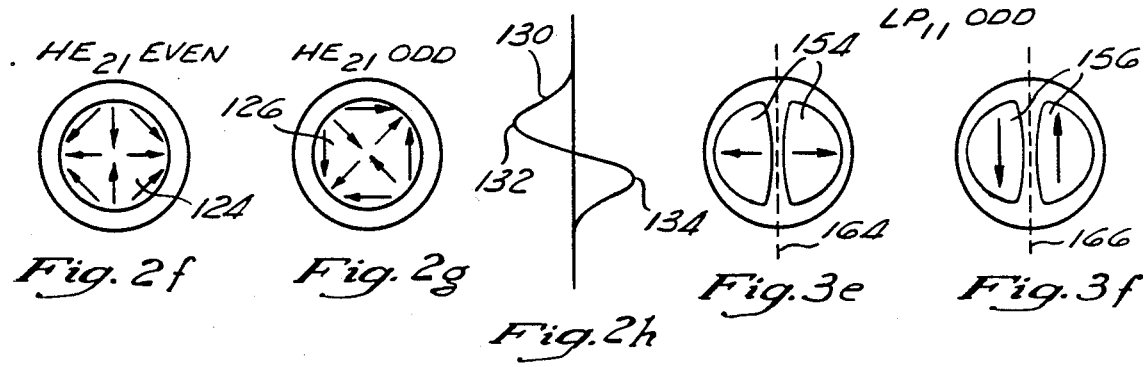

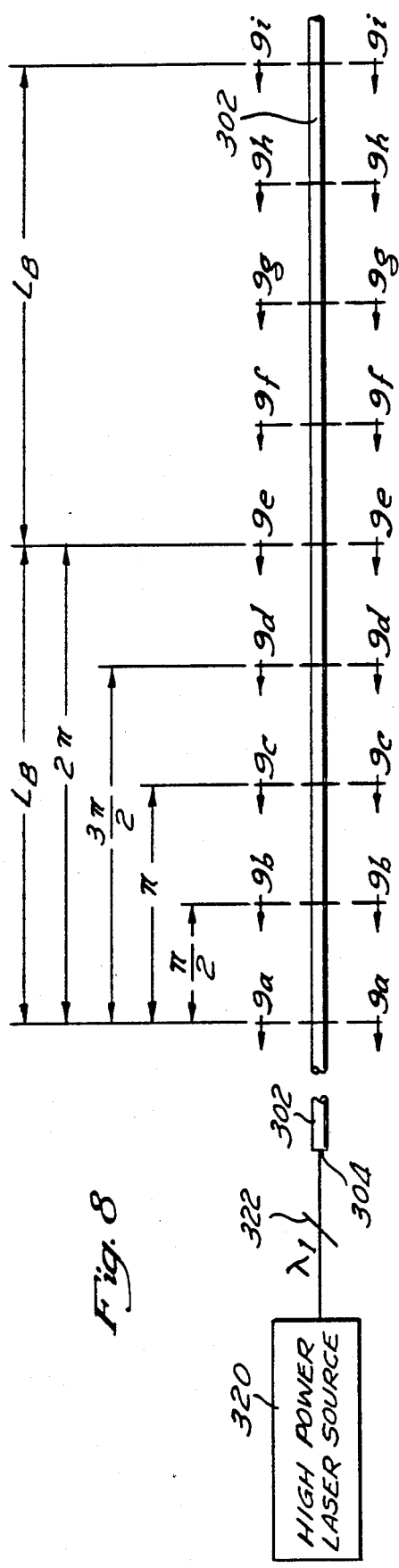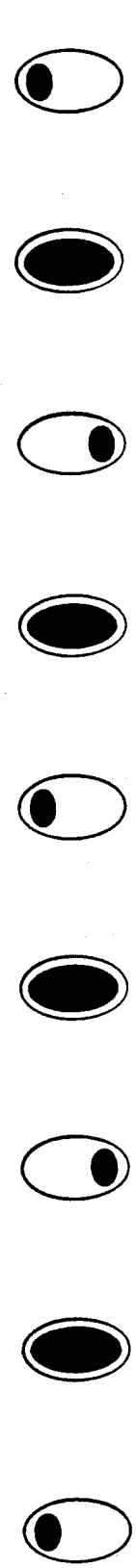

DYNAMIC COUPLERS USING TWO-MODE OPTICAL WAVEGUIDES

RELATED APPLICATIONS

This application is a continuation-in-part application of U.S. patent application Ser. No. 017,762, filed on Feb. 20, 1987, and issuing on May 3, 1988, as U.S. Pat. No. 4,741,586.

FIELD OF THE INVENTION

The present invention relates generally to optical waveguide devices and, more particularly, to devices which incorporate two-mode optical waveguides to control the propagation of optical energy in the two-modes of the waveguide.

BACKGROUND OF THE INVENTION

An optical fiber is an optical waveguide having a central core surrounded by an outer cladding. The refractive indices of the core and cladding are selected so that optical energy propagating in the optical fiber is well-guided by the fiber.

As is well known in the art, a single optical fiber may provide one or more propagation paths under certain conditions. These propagation paths are commonly referred to as the normal modes of a fiber, which may be conceptualized as independent optical paths through the fiber. Normal modes have unique electric field distribution patterns which remain unchanged, except for amplitude as the light propagates through the fiber. Additionally, each normal mode will propagate through the fiber at a unique propagation velocity.

The number of modes which may be supported by a particular optical fiber is determined by the wavelength of the light propagating therethrough. If the wavelength is greater than a "second-order mode cutoff" wavelength (i.e., the frequency of the light is less than a cutoff frequency), the fiber will support only a single mode. If the wavelength is less than cutoff (i.e., the frequency is greater than the cutoff frequency), the fiber will begin to support higher order modes. For wavelengths less than, but near cutoff, the fiber will support only the fundamental, or first-order mode, and the next, or second-order mode. As the wavelength is decreased, the fiber will support additional modes, for example, a third-order, fourth-order, etc.

Each of the normal modes (e.g., first-order, second-order, etc.) are orthogonal, that is, ordinarily, there is no coupling between the light in these modes. The orientation of the electric field vectors of the modes defines the polarization of the light in the mode, for example, linear vertical or linear horizontal. A more complete discussion of these modes, and their corresponding electric field patterns, will be provided below.

A number of devices have been constructed to utilize the orthogonality of the modes of an optical fiber to provide selective coupling between the modes. For example, copending U.S. patent application Ser. No. 884,871, entitled "Fiber Optic Modal Coupler," assigned to the assignee of this invention, describes a device which couples optical energy from the first-order mode to the second-order mode, and vice versa. U.S. patent application Ser. Nos. 820,513 and 909,503, both entitled "Fiber Optic Inter-Mode Coupling Single-Sideband Frequency Shifter," and both assigned to the assignee of this invention, disclose frequency shifters which couple optical energy from one propagation mode to another propagation mode while shifting the frequency of the optical energy. U.S. patent application Ser. No. 820,411, entitled "Fiber Optic Mode Selector," assigned to the assignee of the present invention, discloses a device which separates optical energy propagating in one of the first-order and second-order propagation modes from the other of the first-order and second-order propagation modes.

SUMMARY OF THE INVENTION

The present invention is an apparatus for controlling an optical signal. The apparatus comprises an optical waveguide segment that has first and second spatial propagation modes. The first and second modes have first and second effective indices of refraction, respectively. A perturbational signal source is coupled to the waveguide segment to introduce a perturbational signal into at least one of the spatial modes to optically perturb at least one of the first and second effective indices of refraction. The perturbational signal controllably varies the spatial intensity distribution of the optical signal.

Preferably, the second spatial mode is a higher order mode than the first spatial mode, and the optical waveguide has a non-circular cross section having cross-sectional dimensions selected such that the waveguide guides light in the higher order mode in only a single stable intensity pattern.

Also preferably, the perturbation of the effective refractive index of the one mode phase shifts an optical signal component propagating in that mode. The perturbational signal source varies the intensity of the perturbational signal to vary the phase shift.

Preferably, the optical waveguide segment has an optical intensity distribution pattern caused by the phase relationship between light propagating in the first and second modes. The optical intensity distribution pattern has at least two lobes. The apparatus further includes a mask for blocking light propagating in one of the two lobes. The light in the other unblocked lobe is selectively provided to a detector. The intensity of the light provided to the detector depends upon the phase shift and thus upon the intensity of the perturbational signal.

Another aspect of the present invention is an optical mode coupling apparatus which comprises an optical waveguide that couples an optical signal propagating in the optical waveguide between propagation modes of the waveguide. The optical signal has an optical signal beat length for the modes, and the coupling apparatus also includes a light source for introducing a perturbational light signal into the waveguide. The perturbational signal has an optical wavelength selected such that the perturbational signal propagates in the waveguide in a selected one of the two spatial modes of the waveguide. The perturbational signal has an intensity which is selected to optically perturb the refractive index of the selected spatial propagation mode more than it perturbs the refractive index of the other spatial propagation mode so that the difference between the refractive indices of the two modes is changed. The perturbation of the refractive index is preferably in accordance with the optical Kerr effect. The change in the difference in the refractive indices caused by the perturbational signal causes a change in the phase difference between the optical signal propagating in the selected spatial propagation mode and the optical signal propagating in the other spatial propagation mode.

In the preferred embodiment, the optical waveguide has a non-circular cross section having cross-sectional dimensions selected such that the waveguide guides a portion of the optical signal in a fundamental spatial mode and another portion of the optical signal in a higher order spatial mode. The cross-sectional dimensions of the core are further selected such that the portion of the optical signal guided by the waveguide in the higher order mode propagates in only a single, stable intensity pattern. The preferred embodiment utilizes the fundamental spatial mode of the waveguide and a higher order spatial mode, preferably the second-order spatial mode. The cross-sectional dimensions of the core may be further selected to cause the polarization modes of the two spatial modes to be non-degenerate such that they propagate light at different velocities.

Although the invention may be utilized in connection with various types of waveguides, the waveguide of the preferred embodiment comprises an optical fiber which has an elliptical cross section core, such that the fundamental mode is the $LP_{01}$ mode of the optical fiber and the higher order mode is the $LP_{11}$ mode of the optical fiber. The single intensity pattern is the even mode intensity pattern of the $LP_{11}$ mode.

Advantageously, the present invention may be implemented as a digital switch. In this implementation, the perturbational signal is selectively switched on and off to switch the change in the phase difference in the two modes of the optical signal on and off. In the preferred embodiment of the present invention, the change in the phase difference is detected by an optical detector that is positioned to receive light energy from a selected single lobe of an optical intensity distribution pattern of the light exiting from the optical waveguide at the wavelength of the optical signal, the light from a second lobe of the optical intensity distribution pattern being selectively blocked or otherwise prevented from propagating to the optical detector. The intensity of the light in the selected lobe is dependent upon the phase difference between the light propagating in the two spatial propagation modes of the optical signal, which is in turn dependent upon the change in the refractive index caused by the perturbational signal.

The present invention also includes a method of selectively switching an optical output signal between two states, preferably between a state wherein the intensity of the optical output signal has a relatively large magnitude and a state wherein the intensity of the optical output signal has a relatively small magnitude. The switching of the optical output signal is accomplished by propagating an optical signal in the optical waveguide in first and second spatial propagation modes. The method also includes the step of selectively propagating a perturbational signal (e.g., a pump signal) in the optical waveguide. Preferably, the waveguide comprises an optical fiber and the perturbations are induced in accordance with the optical Kerr effect. In a preferred embodiment, the method also includes the step of switching the perturbational signal between a relatively high intensity level and a relatively low intensity level. Additionally, the waveguide preferably has a core of non-circular cross section, and the method additionally comprises the step of selecting the wavelength of the optical signal in relation to the cross-sectional dimensions of the core such that (1) the waveguide guides a portion of the optical signal in one spatial mode and another portion in a higher order spatial mode, such as the second-order mode, and (2) the portion of the optical signal guided by the waveguide in the higher order mode propagates in only a single, stable intensity pattern. The method also preferably comprises the step of selecting the wavelength of the perturbational signal in relation to the cross-sectional dimensions of the core of the waveguide such that the perturbational signal propagates in a single spatial mode of the waveguide. The method further includes the step of increasing the intensity of the perturbational signal so that the perturbational signal has the effect of changing the refractive index of the spatial propagation mode in which it is propagating relative to the refractive index of the other spatial propagation mode so that the induced difference in the two refractive indices induces a phase difference between the portions of the optical signal propagating in the two spatial propagation modes.

BRIEF DESCRIPTION OF THE DRAWINGS

FIG. 1 is a cross-sectional view of an exemplary circular core optical fiber.

FIGS. 2a and 2b illustrate the electric field intensity distribution patterns for the vertically polarized and horizontally polarized $HE_{11}$ (fundamental) propagation modes of the circular core optical fiber of FIG. 1.

FIG. 2c is a graph of the electric field amplitude distribution corresponding to the intensity distribution patterns of FIGS. 2a and 2b.

FIGS. 2d, 2e, 2f and 2g illustrate the electric field intensity distribution patterns for the $TE_{01}$, $TM_{01}$, even $HE_{21}$ and odd $HE_{21}$ (second-order) propagation modes, respectively, of the circular core optical fiber of FIG. 1.

FIG. $2_h$ is a graph of the electric field amplitude distribution patterns for the second-order modes of the optical fiber of FIG. 1.

FIGS. 3a and 3b illustrate the $LP_{01}$ approximations for the first-order propagation modes of the optical fiber of FIG. 1.

FIGS. 3c, 3d, 3e and 3f illustrate the $LP_{11}$ approximations for the second-order propagation modes of the optical fiber of FIG. 1.

Figure 4:
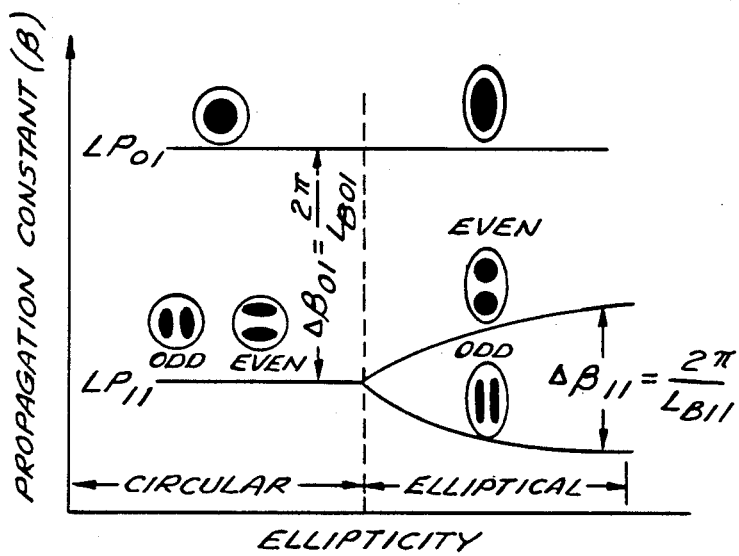

FIG. 4 is an unscaled graph of the propagation constant of an optical waveguide versus the ellipticity of the core of the optical waveguide.

Figures 5, 6A, 6B, 6C:
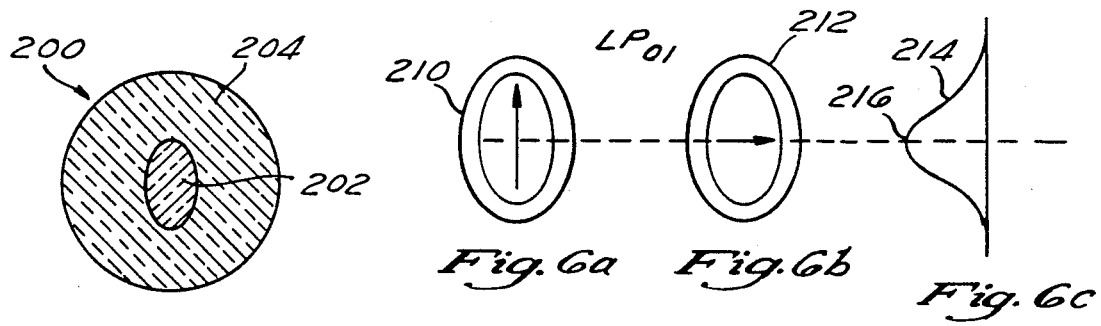

FIG. 5 is a cross-sectional view of an exemplary elliptical core.

FIGS. 6a and 6b illustrate the electric field intensity patterns for the $LP_{01}$ (fundamental) propagation modes of the elliptical core optical fiber of FIG. 5.

FIG. 6c is a graph of the electric field amplitude distribution for the $LP_{01}$ propagation mode of the elliptical core optical fiber of FIG. 5.

Figures 6D, 6E, 6F:
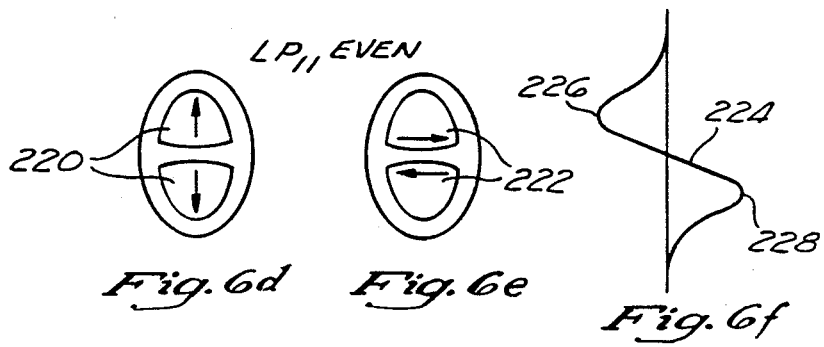

FIGS. 6d and 6e illustrate the electric field intensity patterns for the even $LP_{11}$ propagation modes of the elliptical core optical fiber of FIG. 5.

FIG. 6f is a graph of the electric field amplitude distribution for the even $LP_{11}$ propagation modes of the elliptical core optical fiber of FIG. 5.

Figures 6G, 6H:
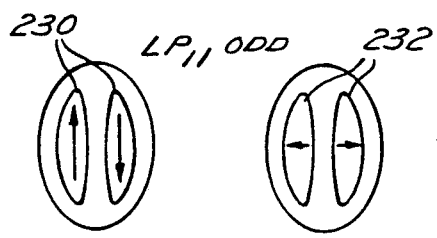

FIGS. 6g and 6h illustrate the electric field intensity patterns for the odd $LP_{11}$ propagation modes of the elliptical core optical fiber of FIG. 5.

Figure 7:
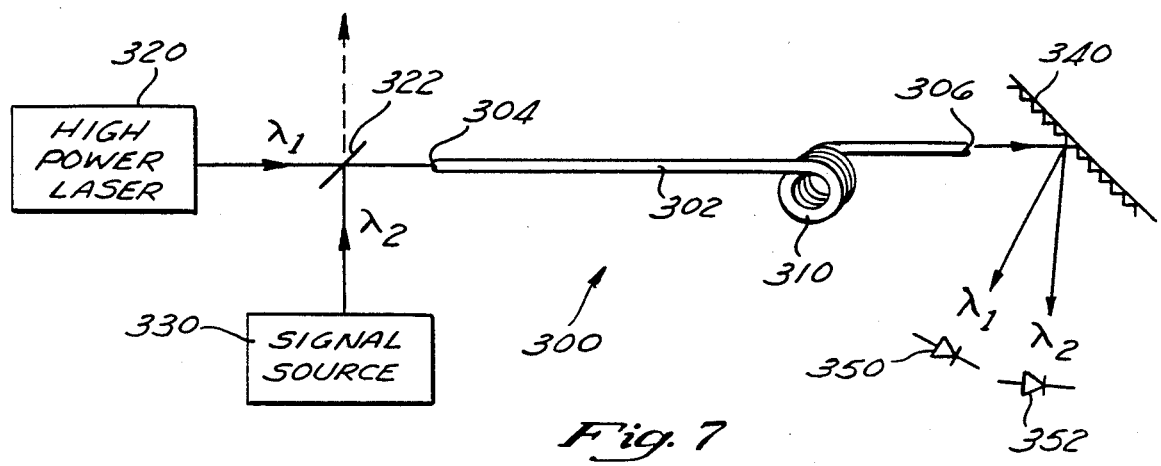

FIG. 7 illustrates a dynamic optical coupler constructed in accordance with one aspect of the invention in which light from a high power laser light source is propagating in an optical fiber in the same direction as light from an optical signal source.

FIG. 8 illustrates a portion of the optical fiber from the dynamic optical coupler of FIG. 7.

FIGS. 9a-9i illustrate cross sections of the electrical field intensity patterns taken at locations 9a—9a, 9b—9b, etc. in FIG. 8.

Figure 10:
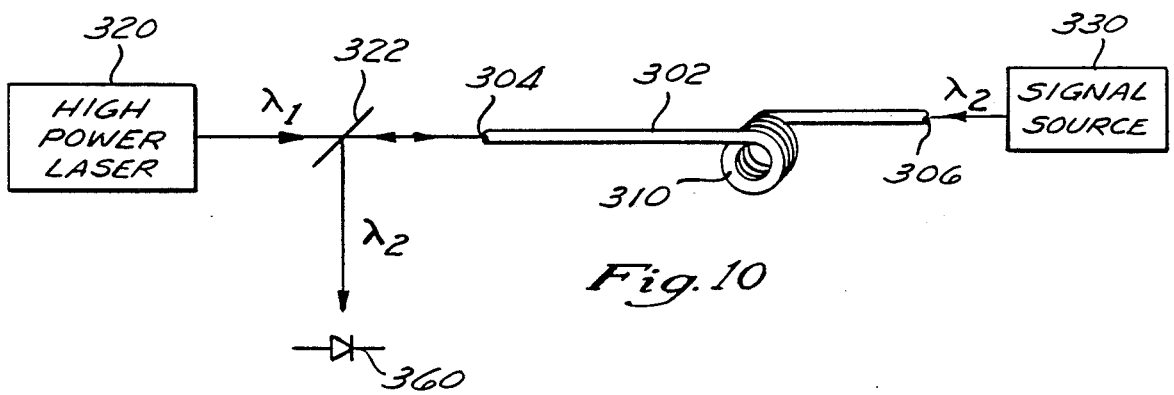

FIG. 10 is an alternative embodiment of the present invention in which the light from a high power laser light source is propagating in an optical fiber in the opposite direction as light from an optical signal source.

Figures 11A, 11B:
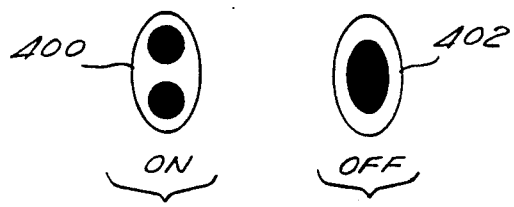

FIG. 11a illustrates the $LP_{11}$ intensity pattern of the light emitted by the embodiment of FIG. 10 when the perturbational light source is on.

FIG. 11b illustrates the $LP_{01}$ intensity pattern of the light emitted by the embodiment of FIG. 10 when the perturbational light source is off.

Figure 12:
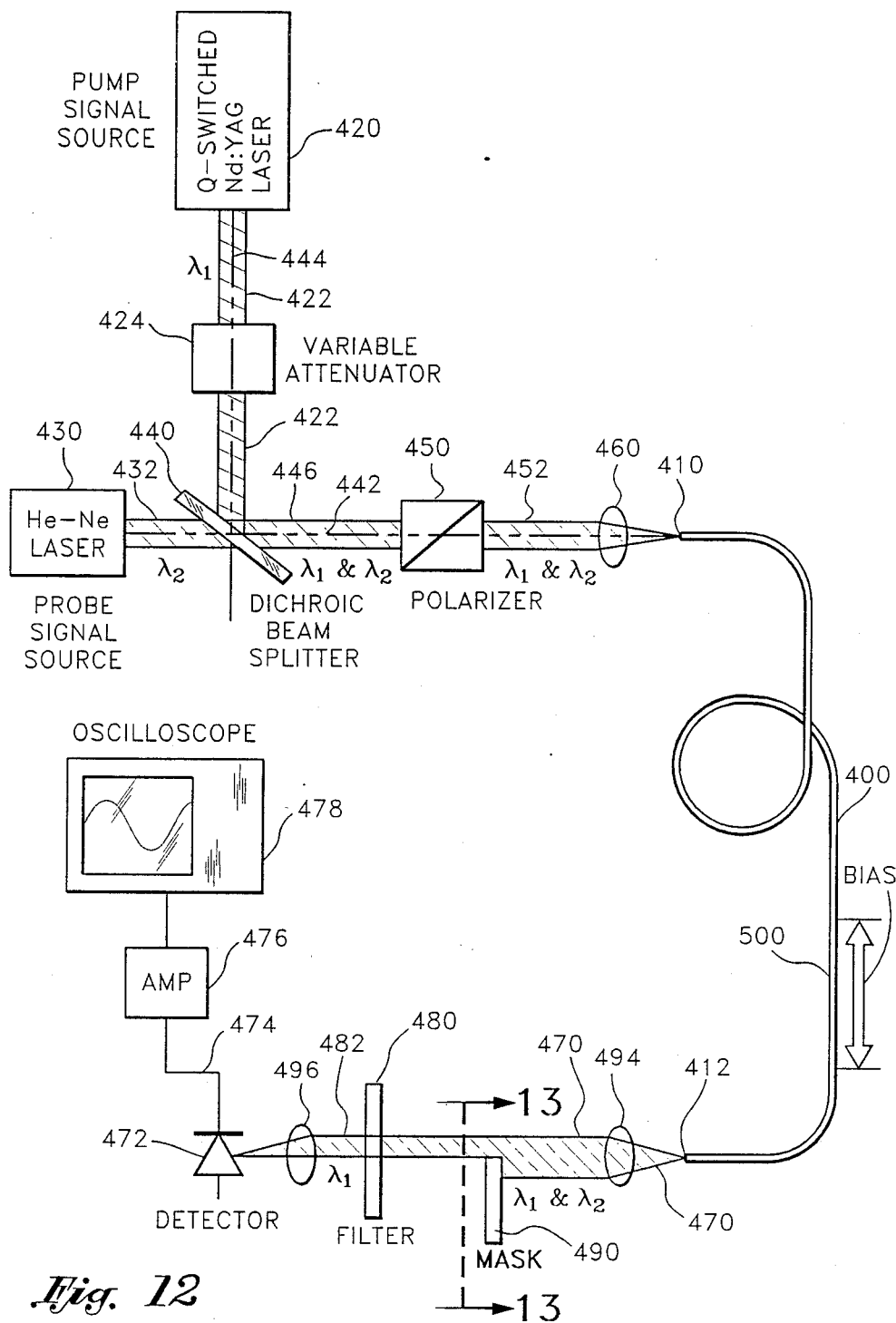

FIG. 12 illustrates a dynamic optical switch constructed in accordance with another aspect of the present invention in which pump light from a high power laser light source is propagating in an optical fiber in the same direction as an optical signal from an optical signal source to cause differential phase delay between the two spatial propagation modes of the optical signal.

Figure 13:
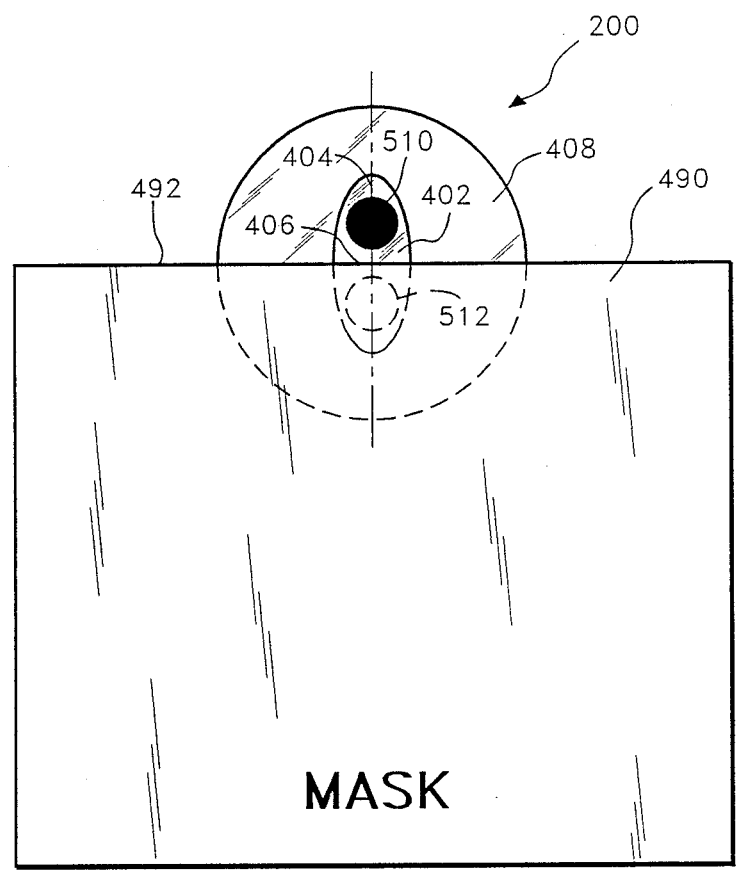

FIG. 13 is an elevation view of the embodiment of FIG. 12 taken along the lines 13—13 in FIG. 12, showing the position of the optical mask with respect to the minor axis of the elliptical core of the optical fiber.

Figure 14A:
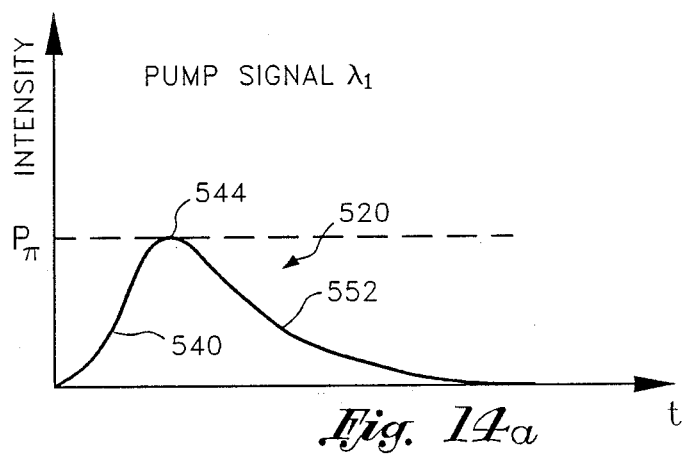

FIG. 14a is a graphical representation of the magnitude of a pump pulse with respect to time.

Figure 14B:
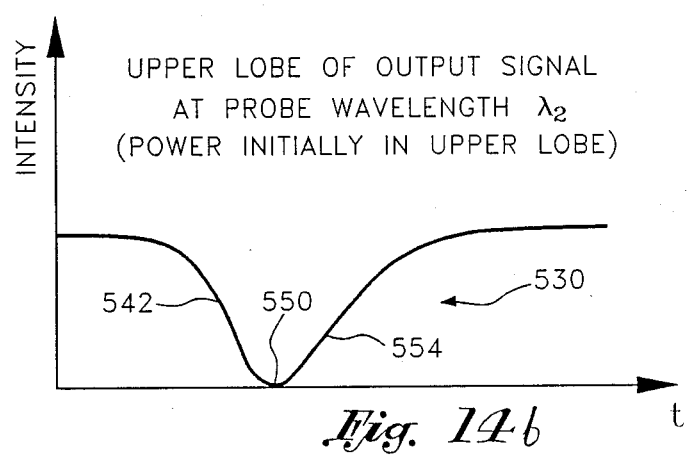

FIG. 14b is a graphical representation of the intensity of the output signal at the probe wavelength in the upper lobe of the optical intensity distribution pattern as a function of time responsive to the pump pulse represented in FIG. 14a, wherein substantially all the intensity of the output signal at the probe wavelength is initially concentrated in the upper lobe.

Figure 14C:
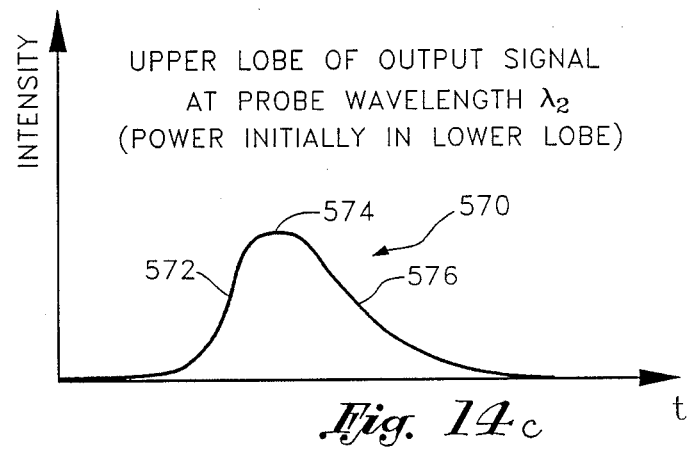

FIG. 14c is a graphical representation of the intensity of the output signal at the probe wavelength in the upper lobe of the optical intensity distribution pattern as a function of time responsive to the pump pulse represented in FIG. 14a, wherein substantially all the intensity of the output signal at the probe wavelength is initially concentrated in the lower lobe.

Figure 15A:
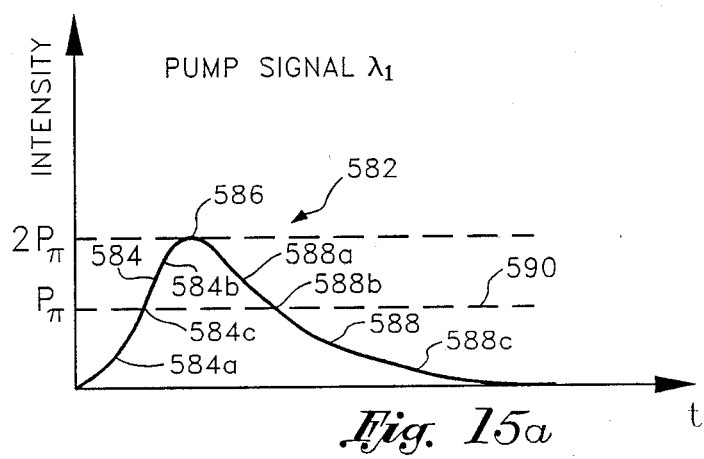

FIG. 15a is a graphical representation of the magnitude of a pump pulse with respect to time wherein the pump pulse of FIG. 15a has a maximum magnitude that is approximately twice the maximum magnitude of the pump pulse represented in FIG. 14a.

Figure 15B:
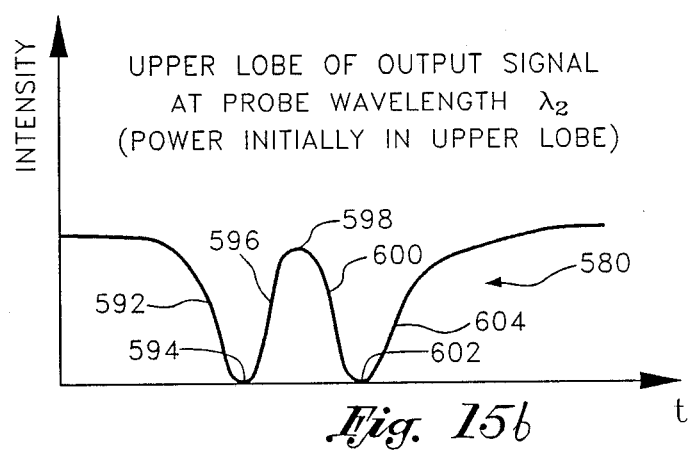

FIG. 15b is a graphical representation of the intensity of the output signal at the probe wavelength in the upper lobe of the optical intensity distribution pattern as a function of time responsive to the pump pulse represented in FIG. 15a, wherein substantially all the intensity of the output signal at the probe wavelength is initially concentrated in the upper lobe.

Figure 15C:
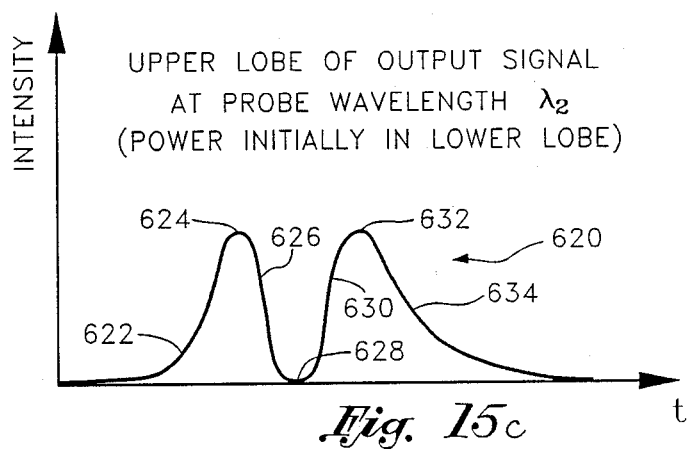

FIG. 15c is a graphical representation of the intensity of the output signal at the probe wavelength in the upper lobe of the optical intensity distribution pattern as a function of time responsive to the pump pulse represented in FIG. 15a, wherein substantially all the intensity of the output signal at the probe wavelength is initially concentrated in the lower lobe.

Figure 16A:
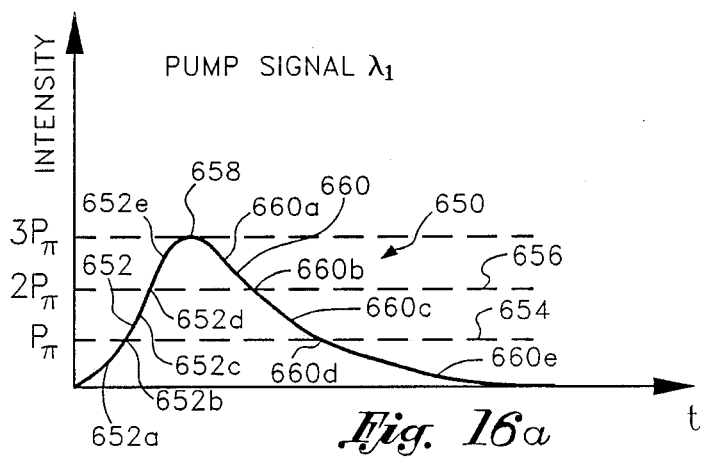

FIG. 16a is a graphical representation of the magnitude of a pump pulse with respect to time wherein the pump pulse of FIG. 15a has a maximum magnitude that is approximately three times the maximum magnitude of the pump pulse represented in FIG. 14a.

Figure 16B:
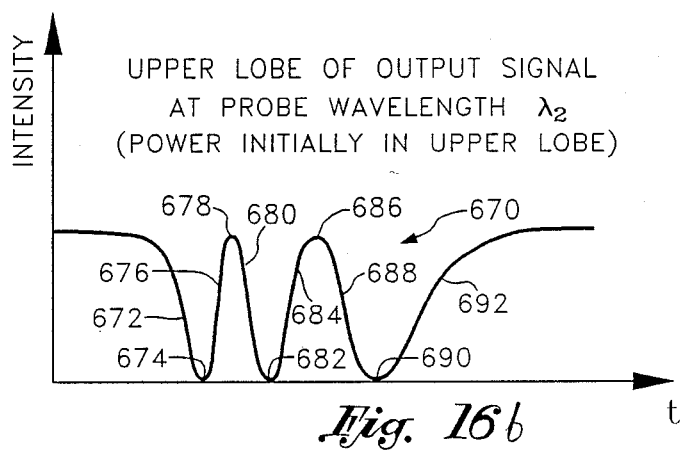

FIG. 16b is a graphical representation of the intensity of the output signal at the probe wavelength in the upper lobe of the optical intensity distribution pattern as a function of time responsive to the pump pulse represented in FIG. 16a, wherein substantially all the intensity of the output signal at the probe wavelength is initially concentrated in the upper lobe.

Figure 16C:
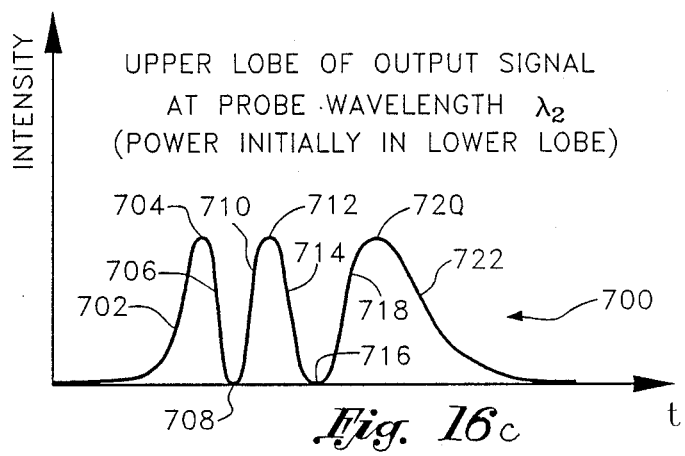

FIG. 16c is a graphical representation of the intensity of the output signal at the probe wavelength in the upper lobe of the optical intensity distribution pattern as a function of time responsive to the pump pulse represented in FIG. 16a, wherein substantially all the intensity of the output signal at the probe wavelength is initially concentrated in the lower lobe.

DETAILED DESCRIPTION OF THE PREFERRED EMBODIMENTS

The present invention utilizes an optical waveguide that operates at a wavelength below cutoff such that the waveguide supports both fundamental and second-order guided modes. The fundamental and second-order guided modes provide two orthogonal paths through the optical waveguide which permits the device to be used as a two-channel optical propagation medium. The embodiments of the present invention utilize an optical waveguide having the geometry of the core selected so that only one stable spatial orientation of the second-order mode is supported in the waveguide.

Before discussing the specific embodiments of the present invention, a detailed description of the optical waveguide and a brief summary of the applicable mode theory will be presented to provide a more complete understanding of the invention. Although described below in connection with a silica glass optical fiber waveguide, one skilled in the art will understand that the concepts presented are also applicable to other optical waveguides, such as a $LiNbO_3$ optical fiber, integrated optics, or the like.

Mode Theory

An exemplary cross section of a silica glass optical fiber 100 is illustrated in FIG. 1. The fiber 100 comprises an inner core 102 and an outer cladding 104. The inner core 102 has a radius of r. In the exemplary fiber 100, the core has a refractive index $n_{co}$ and the cladding has a refractive index $n_{cl}$. As is well known in the art, the core refractive index $n_{co}$ is greater than the cladding index $n_{cl}$ so that an optical signal propagating in the optical fiber 100 is well-guided. The number of modes guided by the optical fiber 100 depends upon the fiber geometry and upon the wavelength of the optical signal propagating therethrough. Typically, the wavelength above which an optical fiber will propagate only the fundamental or first-order mode is referred to as the "second-order mode cutoff" wavelength $\lambda_c$, which may be calculated for a circular core fiber utilizing the following equation:

$$\lambda_c = \frac{2\pi r \sqrt{n_{co}^2 - n_{cl}^2}}{2.405} \quad (1)$$

If the wavelength of the optical signal is greater than the wavelength $\lambda_c$ (i.e., the frequency of the optical signal is less than a cutoff frequency), only the first-order or fundamental propagation mode of the optical signal will be well-guided by the fiber and will be propagated by the fiber. If the wavelength of an optical signal is less than $\lambda_c$ (i.e., the frequency of the optical signal is greater than the cutoff frequency), higher order modes, such as the second-order modes, will begin to propagate.

The true first-order and second-order modes of a circular core optical fiber and their respective electric field amplitude distributions are illustrated in FIGS. 2a–2h. The two first-order modes are the vertically polarized $HE_{11}$ mode represented by an electric field pattern 10 in FIG. 2a, and the horizontally polarized $HE_{11}$ mode, represented by an electric field pattern 112 in FIG. 2b. The outer circle in each figure represents the boundary of the core 102 of the fiber 100 of FIG. 1.

As illustrated in FIG. 2c, the $LP_{01}$ modes have an electric field amplitude distribution 116 that is substantially symmetrical around the centerline of the core 102. The electric field amplitude distribution 116 is concentrated in the center of the core 102 and decreases as the distance from the center of the core 102 increases. A small portion of the electric field amplitude distribution 116 often extends beyond the boundaries of the core. This extended electric field is commonly referred to as the evanescent field of the guided modes.

The four true second-order modes are illustrated in FIGS. 2d–2g. These four true modes are distinguished by the orientation of the transverse electric field, denoted by the directions of the arrows in FIGS. 2d–2g, and are commonly referred to as the $TE_{01}$ mode, represented by an electric field pattern 120 in FIG. 2d; the $TM_{01}$ mode, represented by an electric field pattern 122 in FIG. 2e; the $HE_{21}$ even mode, represented by an electric field pattern 124 in FIG. 2f; and the $HE_{21}$ odd mode, represented by an electric field pattern 126 in FIG. 2g.

An electric field amplitude distribution 130 for an exemplary optical signal propagating in the second-order modes is illustrated in FIG. 2h. As illustrated, the electric field amplitude distribution 130 is substantially equal to zero at the centerline of the core, and has two maximum amplitudes 132 and 134 near the boundary of the core. As further illustrated, the two amplitude maxima 132 and 134 are 180° out of phase. Further, a greater portion of the electric field distribution extends beyond the boundary of the core in the second-order modes, thus providing a larger evanescent field than for the $HE_{11}$ modes.

Each of the four true second-order modes has a slightly different propagation velocity from the other of the four second-order modes. Thus, when one or more of the true second-order modes are co-propagating in a two-mode fiber, the intensity distribution of the second-order mode varies as a function of the length of the fiber as a result of changes in the phase differences between the four modes as they propagate. The cross-sectional intensity distribution of the second-order mode changes in response to environmental changes that induce differential phase shifts between the almost degenerate four modes.

In order to more easily analyze the characteristics of optical signals propagating in the second-order propagation modes, the characteristics of the modes are analyzed using the LP approximations for the modes defined and described in detail in D. Gloge, "Weakly Guiding Fibers," *Applied Optics*, Vol. 10, No. 10, October 1971, pp. 2252–2258.

A better understanding of the mode theory of optical propagation in an optical fiber or other circular core waveguide can be obtained by referring to FIGS. 3a–3f, and wherein the first and second modes are represented in accordance with the LP approximations described by Gloge in his paper. The outer circles in each of the illustrations again represent the cross section of the core 102 of the optical fiber 100 of FIG. 1. The outlines within the core circles represent the electric field distributions. Arrows with the inner outlines represent the direction of polarization.

FIGS. 3a–3b show the field patterns of the two polarization modes in the fundamental $LP_{01}$ set of modes. A field pattern 140 in FIG. 3a represents vertically polarized light in the $LP_{01}$ fundamental mode, and a field pattern 142 in FIG. 3b represents horizontally polarized light in the fundamental $LP_{01}$ mode.

FIGS. 3c–3f illustrate the $LP_{11}$ approximations for the second-order modes. As illustrated in FIGS. 3c–3f, there are four $LP_{11}$ modes, each having two lobes for the electric field distribution. Two of the modes, represented by an $LP_{11}$ mode pattern 150 in FIG. 3c and an $LP_{11}$ mode pattern 152 in FIG. 3d, are referred to herein as the $LP_{11}$ even modes. The other two $LP_{11}$ modes, represented by an $LP_{11}$ mode pattern 154 in FIG. 3e and an $LP_{11}$ mode pattern 156 in FIG. 3f, are referred to as the $LP_{11}$ odd modes. The four $LP_{11}$ modes are distinguished by the orientation of the lobe patterns and the orientation of the electric field vectors (i.e., the polarization vectors) within the lobe patterns. For example, the first $LP_{11}$ even mode field pattern 150 (FIG. 3c) has two lobes that are symmetrically located about a horizontal zero electric field line 160. Within the two lobes, the electric field vectors are parallel to and anti-symmetric about the zero electric field line 160. For convenience, the $LP_{11}$ mode represented by the lobe pattern 150 will be referred to as the horizontally polarized $LP_{11}$ even mode.

The second $LP_{11}$ even lobe pattern 152 (FIG. 3d) is symmetrically located about a horizontal zero electric field line 142. Within the two lobes of the field pattern 152, the electric field vectors are perpendicular to and anti-symmetric about the zero electric field line 162. The $LP_{11}$ mode represented by the electric field pattern 152 will be referred to as the vertically polarized $LP_{11}$ even mode.

The first $LP_{11}$ odd mode field pattern 154 has two lobes that are symmetrically located about a vertically oriented zero electric field line 164. Within the two lobes, the electric field vector is perpendicular to and anti-symmetric about the zero electric field line 164, and are thus oriented horizontally. The $LP_{11}$ mode represented by the field pattern 154 will thus be referred to as the horizontally polarized $LP_{11}$ odd mode.

The electric field pattern 156 of the second $LP_{11}$ odd mode has two lobes that are symmetrically located about a vertically oriented zero electric field line 166. Within the two lobes, the electric field vectors are parallel to and anti-symmetric about the zero electric field line 166. Thus, the $LP_{11}$ mode represented by the electric field pattern 156 will be referred to as the vertically polarized $LP_{11}$ odd mode.

In the LP-mode approximations, each of the six electric field patterns in FIGS. 3a–f, namely the two $LP_{01}$ patterns and the four $LP_{11}$ patterns, are orthogonal to each other. In other words, in the absence of perturbations to the optical waveguide, there is substantially no coupling of optical energy from one of the field patterns to any of the other field patterns. Thus, the six electric field patterns may be viewed as independent optical paths through the optical waveguide, which ordinarily do not couple with each other.

If the indices of the core 102 and the cladding 104 of the optical fiber 100 are approximately equal, the two $LP_{01}$ modes will travel through the fiber at approximately the same propagation velocity, and the four second-order $LP_{11}$ modes will travel through the fiber at approximately the same propagation velocity. However, the propagation velocity for the fundamental $LP_{01}$ set of modes will be slower than the propagation velocity for the second-order $LP_{11}$ set of modes. Thus, the two sets of modes, $LP_{01}$ and $LP_{11}$, will move in and out of phase with each other as the light propagates through the fiber. The propagation distance required for the two sets of modes to move out of phase by 360° (i.e., $2\pi$ radians) is commonly referred to as the beat length of the fiber, which may be mathematically expressed as:

$$L_B = \frac{\lambda}{\Delta n} = \frac{2\pi}{\Delta \beta} \tag{2}$$

where $L_B$ is the beat length, $\lambda$ is the optical wavelength in a vacuum, $\Delta n$ is the difference in the effective refractive indices of the two sets of modes, and $\Delta \beta$ is the difference in the propagation constants for the two sets of modes.

It has been previously shown that coherent power transfer between the two sets of the modes, $LP_{01}$ and $LP_{11}$, can be achieved by producing periodic perturbations in the optical fiber that match the beat length of the two modes. A number of optical devices have been constructed to control the coupling of optical energy between the two modes to provide useful devices for selective coupling, filtering and frequency shifting of an optical signal. See, for example, W. V. Sorin, et al., "Highly selective evanescent modal filter for two-mode optical fibers," *OPTICS LETTERS*, Vol. 11, No. 9, September 1986, pp. 581–583; R. C. Youngquist, et al., "All-fibre components using periodic coupling," *IEEE Proceedings*, Vol. 132, Pt. J, No. 5, October 1985, pp. 277–286; R. C. Youngquist, et al., "Two-mode fiber modal coupler," *OPTICS LETTERS*, Vol. 9, No. 5, May 1984, pp. 177–179; J. N. Blake, et al., "Fiber-optic modal coupler using periodic microbending," *OPTICS LETTERS*, Vol. 11, No. 3, March 1986, pp. 177–179; B. Y. Kim, et al., "All-fiber acousto-optic frequency shifter," *OPTICS LETTERS*, Vol. 11, No. 6, June 1986, pp. 389–391; and J. N. Blake, et al., "All-fiber acousto-optic frequency shifter using two-mode fiber," *Proceedings of the SPIE*, Vol. 719, 1986. The present invention provides substantial improvement to many of those devices and provides a number of new devices that utilize coupling between the modes to further control an optical signal.

Although the four $LP_{11}$ modes provide four orthogonal channels for the propagation of optical energy through an optical fiber or other waveguide, it has often been found to be difficult to fully utilize the four channels independently. As set forth above, the $LP_{11}$ modes are approximations of real modes and are nearly degenerate in a circular core fiber 100. This makes the $LP_{11}$ modes very sensitive to couplings caused by perturbations in the optical fiber, such as bending, twisting and lateral stressing. Furthermore, since the $LP_{11}$ modes are only an approximation of the real modes, there will be a slight amount of coupling even in the absence of perturbations of the fiber 100. The net result is that the propagation of an $LP_{11}$ mode electric field pattern in a given mode is not stable. In like manner, the electric field patterns of the two $LP_{01}$ polarization modes are likewise unstable.

It has been previously shown that the use of an elliptical core cross section in an optical fiber or other waveguide can introduce birefringence and separate the propagation constants for the two polarizations of the $LP_{01}$ first-order mode. The separation of the propagation constants locks the polarization of the signal to a principle axis of the core cross section. It has also been shown that an elliptical core also increases the separation between the propagation constants of the $LP_{11}$ mode patterns. This tends to enhance modal stability. This is illustrated in FIG. 4 which is an unscaled representation of the propagation constant $\beta$ versus the ellipticity of the core of an optical waveguide. As illustrated, the $LP_{01}$ propagation mode has a larger propagation constant than the $LP_{11}$ propagation mode. From Equation (2), this difference in the propagation constants is related to the beat length $L_B$ between the $LP_{01}$ and $LP_{11}$ propagation modes as follows:

$$\Delta \beta_{01} = \frac{2\pi}{L_{B01}} \tag{3}$$

where $\Delta \beta_{01}$ is the difference in the propagation constants between the $LP_{01}$ mode and the $LP_{11}$ mode, and $L_{B01}$ is the beat length between the $LP_{01}$ and $LP_{11}$ modes.

As illustrated in the left-hand portion of FIG. 4, when the core of the optical waveguide is substantially circular, the $LP_{11}$ odd and even modes have substantially the same propagation constant. However, when the core of the optical waveguide is elliptical, the propagation constants of the odd and even $LP_{11}$ modes are different. This is illustrated by the propagation constant difference $\Delta \beta_{11}$ in the right half of FIG. 4. As illustrated, the difference in the propagation constants of the odd and even $LP_{11}$ modes ($\Delta \beta_{11}$) increases as the ellipticity increases. The use of an elliptical core optical fiber has been suggested as a means of avoiding the degeneracy of the orthogonal lobe orientations of the $LP_{11}$ modes. See, for example, J. N. Blake, et al., "All-fiber acousto-optic frequency shifter using two-mode fiber," *Proceedings of the SPIE*, Vol. 719, 1986.

The foregoing differences in the propagation constants between the $LP_{01}$ mode and the odd and even $LP_{11}$ modes when the core of the optical fiber is elliptical, also results in a change in the cutoff wavelength and the corresponding cutoff frequency. For example, for a circular core optical fiber, the cutoff wavelength is related to the radius of the fiber core, as set forth in Equation (1) above. Thus, optical signals having wavelengths above the second-order mode cutoff wavelength $\lambda_c$ (i.e., frequencies below the second-order mode cutoff frequency) will not propagate in the second-order or higher modes in the optical fiber. Optical signals having wavelengths less than the cutoff wavelength $\lambda_c$ will propagate in the second-order modes. If the wavelength is further reduced to a wavelength $\lambda_{c2}$, third-order and higher modes will be supported by the optical waveguide. For a circular core optical waveguide, $\lambda_{c2}$ can be found by the following equation:

$$\lambda_{c2} = \frac{2\pi r \sqrt{n_{co}^2 - n_{cl}^2}}{3.832} \tag{4}$$

where r, $n_{co}$ and $n_{cl}$ are as set forth above for Equation (1). One skilled in the art will understand that the foregoing can also be represented by cutoff frequencies. For example, the first cutoff wavelength $\lambda_c$ corresponds to a first cutoff frequency $f_c$, and the second cutoff wavelength $\lambda_{c2}$ corresponds to a second cutoff frequency $f_{c2}$ that is greater than the first cutoff frequency $f_c$. Specifically, for the circular core optical waveguide, if the first cutoff frequency $f_c$ is normalized to 2.405, the second cutoff frequency $f_{c2}$ will be normalized to 3.832. In other words, the second cutoff frequency will be 1.59 times greater than the first cutoff frequency (e.g., $f_{c2}/f_c = 3.832/2.405 = 1.59$). Thus, an optical signal having a normalized frequency less than 2.405 will propagate in the optical waveguide only n the $LP_{01}$ mode. An optical signal having a normalized frequency in the range of 2.405 to 3.832 will also propagate in the second-order $LP_{11}$ mode. An optical signal having a normalized frequency greater than 3.832 will propagate in higher order modes.

The foregoing relationships also apply when the core of the optical waveguide is elliptical or has some other non-circular geometry. For example, Allan W. Snyder and Xue-Heng Zheng, in "Optical Fibers of Arbitrary Cross-Sections," *Journal of the Optical Society of America A*, Vol. 3, No. 5, May 1986, pp. 600–609, set forth the normalization factors for a number of different waveguide cross sections. For example, an elliptical core waveguide, having a major axis that is twice the length of the minor axis, will have a normalized cutoff frequency $f_c$ of 1.889 when the minor axis has the same length as the diameter of a corresponding circular core optical fiber of the same material construction. In other words, below the normalized frequency of 1.889, only the first-order $LP_{01}$ modes will propagate. Similarly, Snyder and Zheng suggest that the $LP_{11}$ even mode will have a normalized cutoff frequency of 2.505, and the $LP_{11}$ odd mode will have a normalized cutoff frequency of 3.426.

Snyder and Zheng generalize the foregoing concept for an elliptical core optical waveguide with varying ratios between the length of the minor axis and the length of the major axis as follows:

$$f_c = 1.700(1+(b/a)^2)^{178} \tag{5a}$$

$$f_{c2even} = 1.916(1+3(b/a)^2)^{\frac{1}{2}} \tag{5b}$$

$$f_{c2odd} = 1.916(3+(b/a)^2)^{\frac{1}{2}} \tag{5c}$$

where $f_c$ is the normalized cutoff frequency for the $LP_{01}$ mode, below which optical energy will propagate only in the $LP_{01}$ mode in the elliptical core optical fiber; where $f_{c2even}$ is the normalized cutoff frequency for optical energy propagating in the $LP_{11}$ even mode, below which optical energy will propagate only in the $LP_{11}$ even mode but not in the $LP_{11}$ odd mode; and where $f_{c2odd}$ is the normalized cutoff frequency for the $LP_{11}$ odd mode, below which optical energy will propagate in the $LP_{11}$ odd mode as well as the $LP_{11}$ even mode, but not in any of the higher order modes; b is one-half the length of the minor axis of the elliptical core; and a is one-half the length of the major axis of the elliptical core. Equations (5a), (5b) and (5c) can be evaluated for an elliptical core fiber having a major axis length 2a of twice the minor axis length 2b to obtain the normalized frequencies 1.889, 2.505 and 3.426, set forth above. Equations (5a), (5b) and (5c) can be further evaluated for b=a (i.e., for a circular core) to obtain the $LP_{01}$ cutoff frequency of 2.405 and the $LP_{11}$ cutoff frequency of 3.832 for both the odd and even modes, as set forth above.

The foregoing properties of the elliptical core optical waveguide are advantageously utilized in the present invention to improve the operating characteristics of the optical waveguide by eliminating the $LP_{11}$ odd propagation mode and thus provide only one spatial orientation for the electric field pattern of the second-order mode. This is illustrated in FIGS. 5 and 6a–6g.

FIG. 5 illustrates an exemplary optical fiber 200 having an elliptical core 202 and a surrounding cladding 204. The dimensions of the elliptical core 202 are selected so that the cutoff wavelengths and frequencies for the two orthogonal lobe patterns of the second-order mode are well separated. An optical signal is applied to the fiber 200 that is within a frequency range selected to be above the cutoff frequency $f_{c2even}$ and to be below the cutoff frequency $f_{c2odd}$. For example, in an exemplary optical fiber having a first cutoff frequency $f_c$ that is normalized to 1.889, and a second frequency $f_{c2even}$ of 2.505, the frequency of the input optical signal is selected to have a normalized frequency in the range of 1.889 to 2.505. Thus, a light source is selected so that substantially all of the light produced by the light source has a normalized frequency that is substantially less than the second cutoff frequency that is substantially less than the second cutoff frequency $f_{c2even}$, and that has a substantial portion of the light that has a normalized frequency that is greater than the first cutoff frequency $f_c$. In terms of wavelength, substantially all of the light produced by the light source has one or more wavelengths that are greater than the second cutoff wavelength $\lambda_{c2even}$, and wherein a substantial portion of the light has at least one wavelength that is less than the first cutoff wavelength $\lambda_c$. Thus, the light entering the optical fiber is caused to propagate only in either the first-order $LP_{01}$ mode or the $LP_{11}$ even mode. Since the frequency of the optical signal is selected to be less than the cutoff wavelength for the $LP_{11}$ odd mode, substantially no light propagates in the $LP_{11}$ odd mode.

The foregoing is illustrated in FIGS. 6a–6g. In FIGS. 6a and 6b, the two polarization modes for the $LP_{01}$ first-order mode are illustrated. An electric field pattern 210 in FIG. 6a represents the electric field for the vertically polarized $LP_{01}$ mode, and an electric field pattern 212 in FIG. 6b represents the electric field for the horizontally polarized $LP_{01}$ mode. One skilled in the art will understand that the optical fiber 200 (FIG. 5) is birefringent for the first-order $LP_{01}$ mode, and that the horizontally polarized $LP_{01}$ mode will propagate at a greater velocity than the vertically polarized $LP_{01}$ mode. An electric field amplitude distribution 214 for the $LP_{01}$ propagation modes is illustrated in FIG. 6c. As illustrated, the electric field amplitude distribution 214 is similar to the electric field amplitude distribution 116 in FIG. 2b, for a circular core fiber and has a peak amplitude 216 proximate to the centerline of the core 203.

FIGS. 6d and 6e illustrates the $LP_{11}$ even modes for the elliptical core fiber 200. As illustrated in FIGS. 6d and 6e, respectively, a vertically polarized even mode electric field pattern 220 and a horizontally polarized even mode electric field pattern 222 are both well-guided by the optical fiber 200. As illustrated in FIG. 6f, the $LP_{11}$ even modes have an electric field amplitude distribution, represented by a curve 224, that has a first maxima 226 proximate to one boundary of the core, and that has a second maxima 228 proximate to an opposite boundary of the core, and wherein the first maxima 226 and the second maxima 228 are 180° out of phase.

The $LP_{11}$ odd vertical polarization mode, represented by an electric field pattern 230 (FIG. 6f), and the $LP_{11}$ odd horizontal polarization mode, represented by an electric field pattern 232 (FIG. 6g), are not guided by the optical fiber 200 when the optical wavelength is selected to be above the second cutoff wavelength $\lambda_{c2even}$. Thus, the optical energy in the $LP_{11}$ odd modes, represented by the field patterns 230 and 232, will not propagate. Thus, rather than providing four degenerate optical communication channels, such as provided by a circular core waveguide or a slightly elliptical core waveguide, the highly elliptical core 202 of the optical fiber 200 provides only two $LP_{01}$ mode propagation channels and two $LP_{11}$ even mode propagation channels. Furthermore, the communication channels are well-defined and stable, and, in the absence of a perturbation in the optical fiber 200, there is no coupling between any of the four channels. Therefore, an optical signal can be launched in the second-order $LP_{11}$ mode, and it will propagate only in the $LP_{11}$ even mode. It is not necessary to avoid exciting the odd lobe patterns of the second-order $LP_{11}$ mode because optical energy in those lobe patterns will not propagate. Furthermore, optical energy will not be coupled to the odd lobe patterns.

Because of the stability of the electric field intensity patterns of the $LP_{01}$ mode and the $LP_{11}$ even modes, the performances of fiber optic devices previously developed to utilize the second-order $LP_{11}$ mode will be increased. Specific examples of devices utilizing the highly elliptical core waveguide will be set forth hereinafter.

Description of the Dynamic Optical Coupler Utilizing a Perturbational Signal Operating in Two Modes The optical fiber 200 of FIG. 5, or another optical waveguide having a non-circular cross section, can be advantageously used in a dynamic optical coupler. One such dynamic optical coupler 300 in accordance with one aspect of the present invention is illustrated in FIG. 7. The dynamic optical coupler 300 of FIG. 7 comprises an optical fiber 302. The optical fiber 302 has a first end portion 304 and a second end portion 306. An intermediate portion of the optical fiber 302 is formed into a tightly wound coil 310 to provide an $LP_{11}$ mode stripper, that will be explained more fully below. A high power laser light source 320 is provided that generates a laser output signal having a wavelength $\lambda_1$. The laser output signal can be switched on and off by selectively enabling and disabling the electrical input to the high power laser light source 320 with an electrical switch or the like, by modulating the laser output signal, or by other conventional means. The laser output signal generated by the source 320 is a perturbational signal, as will be explained below. The laser output signal from the high power laser light source 320 is directed to a beam splitter 322. Approximately 50% of the optical energy in the laser output signal passes through the beam splitter 322 and is input into the first end portion 304 of the optical fiber 302. The first end portion of the optical fiber 302 is positioned with respect to the beam splitter 322 so that the laser output signal from the high power laser light source 320 provides approximately equal excitation in the fundamental and second-order modes of the optical fiber 302.

A signal source 330, which is advantageously a laser signal source, is also provided. The signal source 330 generates a relatively low power output signal having a wavelength $\lambda_2$ that is preferably close to but not equal to the wavelength $\lambda_1$. The lower power output signal from the signal source 330 is directed to the beam splitter 322 which directs approximately 50% of the optical energy of the lower power output signal to the first end portion of the optical fiber 302. The signal source 330 is positioned with respect to the first end portion 304 of the optical fiber 302 so that substantially all of the optical energy incident upon the first end portion 304 is caused to propagate in one or the other of the fundamental or the second-order spatial modes.

A diffraction grating 340 is positioned proximate to the second end portion 306 of the optical fiber 302. The diffraction grating 340 is oriented with respect to the second end portion 306 of the fiber 302 so that optical signals output from the second end portion 306 having a wavelength $\lambda_1$ are refracted to a first location, and optical signals output from the second end portion 306 having a wavelength $\lambda_2$ are refracted to a second location different from the first location. The refracted optical signals can be viewed with a screen (not shown), or, alternatively, the intensities of the refracted signals can be detected by first detector 350 positioned to detect the refracted optical signal having the wavelength $\lambda_1$ and a second detector 352 positioned to detect the refracted optical signal having the wavelength $\lambda_2$.

When the high power laser signal is applied to the first end portion 304 of the optical fiber 302, the approximately equal excitation of the first-order $LP_{01}$ and the second $LP_{11}$ modes in the elliptical core of the two-mode fiber 302 creates a period pattern in the cross-sectional intensity distribution along the length of the optical fiber 302 as the two spatial modes propagate in the optical fiber 302 with different phase velocities. This is illustrated in FIG. 8 and in FIGS. 9a–9i, where FIG. 8 represents a portion of the optical fiber 302, and FIGS. 9a–9i represent cross sections of the optical intensity distribution patterns at the locations 9a—9a, 9b—9b, etc., in FIG. 8. In FIGS. 9a–9i, the presence of optical energy in the intensity distribution is represented by the dark portions of the intensity patterns, and the absence of optical energy is illustrated by the light portions of the patterns. FIGS. 9a, 9c, 9e, 9g and 9i illustrate the highly asymmetric intensity distributions that occur at locations where the phase difference between the two modes is $N\pi$, and most of the optical power is concentrated in one-half of the elliptical core. For example, FIG. 9a illustrates the intensity distribution when the phase difference is zero (i.e., $0\pi$); FIG. 9c illustrates the intensity distribution when the phase difference is $\pi$; and FIG. 9e illustrates the intensity distribution when the phase difference is $2\pi$. When the phase difference is $(N+\frac{1}{2})\pi$, the intensity distribution is symmetric. FIG. 9b illustrates the symmetric intensity distribution when the phase difference is $\pi/2$, and FIG. 9d illustrates the symmetric intensity distribution when the phase difference is $3\pi/2$. As illustrated in FIG. 8 and in FIGS. 9a–9i, the mode intensity patterns are periodic and repeat every beat length $L_B$ along the length of the optical fiber 302.

The existence of optical power in an optical waveguide, such as the optical fiber 302, alters the refraction index of the glass medium through the optical Kerr effect. This effect is due to the third-order nonlinear polarization of the glass medium and occurs even when the optical power is small. When the high power laser light from the high power laser light source 320 is launched into the optical fiber 302 with approximately equal intensity for the fundamental $LP_{01}$ and the second-order $LP_{11}$ modes, this nonlinear interaction of the light energy with the glass medium of the optical fiber 302 causes a periodic asymmetric perturbation of the refractive indices of the optical fiber 302. It has been shown that periodic perturbations in an optical fiber can cause coupling between two spatial propagation modes of an optical fiber when the periodicity of the perturbations are matched to the beat length of the two modes. Examples of mode coupling caused by periodic stresses are illustrated in B. Y. Kim, et al., "All-fiber acousto-optic frequency shifter," *OPTICS LETTERS*, Vol. 11, No. 6, June 1986, pp. 389-391; J. N. Blake, et al., "Fiber-optic modal coupler using periodic microbending," *OPTICS LETTERS*, Vol. 11, No. 3, March 1986, pp. 177-179; and J. N. Blake, et al., "All-fiber acousto-optic frequency shifter using two-mode fiber," *Proceedings of the SPIE*, Vol. 719, 1986.

As set forth above, the wavelength $\lambda_2$ of the light generated by the signal source 330 is close to the wavelength of the light generated by the high power laser source 320. It has been shown that the beat length between the two spatial propagation modes of an optical signal does not vary significantly over a relatively wide range of wavelengths. Thus, the periodic changes in the refractive indices of optical fiber 302 caused by the high power laser light having the wavelength $\lambda_1$ are substantially well matched with the wavelength $\lambda_2$. As a result, the perturbations of the refractive indices cause coupling of optical energy between the fundamental and second-order modes of the co-propagating optical energy from the signal source 330 (FIG. 7) in a manner similar to that provided by externally applied periodic perturbations.

The total amount of coupling from one propagation mode to the other propagation mode will vary in accordance with the power applied form the high power laser light source 320 and in accordance with the length of the optical fiber 302 in which the two optical signals interact. By varying the amount of power of the high power laser light source 320 and thus controlling the magnitude of the perturbations caused by the optical Kerr effect, the amount of coupling between the propagation modes of the optical signal generated by the signal source 320 can be controlled.

As an example of the operation of the present invention, the apparatus illustrated in FIG. 7 can be used as a dynamic optical switch in an optical signal processing system, an optical communications, and the like. As set forth above, the optical energy generated by the signal source 330 is advantageously input into the first end portion 304 of the optical fiber 302 at a wavelength $\lambda_2$ with substantially all of the optical energy in one or the other of the fundamental $LP_{01}$ mode or the second-order $LP_{11}$ mode. For example, the optical energy from the signal source 330 can be advantageously input only in the $LP_{11}$ mode. When the high power laser light source 320 is off, the optical energy from the signal source 330 will propagate through the optical fiber 302 with substantially no coupling of optical energy from the $LP_{11}$ mode to the $LP_{01}$ mode. When the optical energy in the $LP_{11}$ mode reaches the mode stripper 310, the optical energy will be radiated from the optical fiber 302, and substantially no optical energy will be emitted from the second end portion of the optical fiber 302.

Thus, the $\lambda_2$ detector 352 will detect substantially no optical energy. Conversely, when the high power laser light source 320 is activated, the perturbations of the refractive indices of the optical fiber 302 will cause coupling of the optical energy from the $LP_{11}$ propagation mode of the $\lambda_2$ optical signal to the $LP_{01}$ propagation mode. The power of the high power laser light source 320 is advantageously adjusted so that substantially 100% coupling to the $LP_{01}$ mode occurs. Any residual optical energy in the $LP_{11}$ propagation mode will be radiated from the optical fiber 302 by the mode stripper 310. The optical energy in the $LP_{01}$ propagation mode at the wavelength $\lambda_2$ will be emitted from the second end portion 306 of the optical fiber 302 and will be directed to the $\lambda_2$ detector 352 by the diffraction grating 322. Thus, the signal output of the $\lambda_2$ detector 352 will be responsive to the on/off control provided by the activation/deactivation of the high power laser light source 320. In an optical signal processing system or optical communications system, the $\lambda_2$ signal output from the diffraction grating 340 can be advantageously provided as an input to additional optical components for further processing.

In like manner, the optical energy from the signal source 330 can be introduced into the first end portion 302 of the optical fiber 304 in the $LP_{01}$ propagation mode. When the high power laser light source 320 is off, the optical energy in the $LP_{01}$ propagation mode will propagate through the optical fiber 302 substantially unchanged and will be emitted from the second end portion 306 and detected by the $\lambda_2$ detector 352. Activation of the high power laser light source 320 will cause coupling of the optical energy from the $LP_{01}$ propagation mode to the $LP_{11}$ propagation mode of the $\lambda_2$ optical signal. The energy of the $LP_{11}$ propagation mode will be radiated from the optical fiber 302 at the mode stripper 310. Thus, if the high power laser light source 320 is adjusted to provide 100% coupling of the optical energy to the $LP_{11}$ propagation mode, substantially no $\lambda_2$ optical energy will be emitted from the second end portion 306 and detected by the $\lambda_2$ detector 352.

As set forth above, the optical energy from the high power laser light source 320 is preferably introduced into the first end portion 304 of the optical fiber 302 with approximately equal intensities in each of the fundamental $LP_{01}$ and second-order $LP_{11}$ propagation modes. This is advantageously accomplished by adjusting the position of the high power laser light source 320 with respect to the first end portion 304 while observing intensity patterns of the optical output from the second end portion 306 of the optical fiber 302. The intensity patterns can be observed by directing the optical output onto a screen (not shown) or the like. There will be a position wherein the centerline of the beam of optical energy from the high power laser source is offset from the centerline of the input end portion 304 of the optical fiber 302 such that the fundamental $LP_{01}$ mode and the second-order $LP_{11}$ mode of the optical energy propagating in the optical fiber 304 are substantially equally excited. As set forth above, the optical fiber 302 has a beat length at the optical wavelength $\lambda_1$. Because of the beat lengths, the intensity patterns of optical energy in the optical fiber 302 are periodic as illustrated in FIG. 8 and FIGS. 9a-9i. In the adjustment method described herein, the position of the high power laser light source 320 is preferably adjusted prior to the formation of the mode stripper 310 (i.e., before the fiber 302 is tightly wound to cause radiation of the optical energy propagating in the second-order $LP_{11}$ propagation mode). Thus, optical energy in both the fundamental $LP_{01}$ and the second-order $LP_{11}$ propagation modes will be emitted from the second end portion 306 of the optical fiber 302. While holding the first end portion 304 in a fixed location, the optical fiber 302 is gently stretched to adjust the length of the optical fiber 302 between the first end portion 304 and the second end portion 306 until the observed intensity pattern exhibits one of the intensity patterns corresponding to a phase difference between the fundamental LP01 and the second-order $LP_{11}$ propagation modes that is an integer multiple of $\pi$ (i.e., one of the mode patterns illustrated in FIGS. 9a, 9c, 9e etc.). After one of the desired intensity patterns is obtained, the first end portion 304 and the second end portion 306 are held in their respective positions to maintain the intensity mode pattern. While holding the first end portion 304 and the second end portion 306 fixed, the position of the high power laser light source 320 is adjusted with respect to the first end portion 304 until the maximum contrast is obtained between the lighted portions of the intensity pattern and the unlighted portion of the intensity pattern. The adjustment of the position of the high power laser light source 320 to obtain maximum contrast corresponds generally to the adjustment of the high power laser light source 320 to obtain substantially equal intensity in the fundamental $LP_{01}$ and the second-order $LP_{11}$ propagation modes although the two intensities may not be precisely equal.

In a similar manner, the position of the signal source 330 with respect to the first end portion 304 of the optical fiber 302 is adjusted until substantially all of the $\lambda_2$ optical energy is introduced into the first end portion 304 in one or the other of the propagation modes. This adjustment is also performed prior to forming the mode stripper 310 and while holding the first end portion 304 fixed with respect to the high power laser light source 320 after the previous adjustment. However, rather than attempting to obtain maximum contrast between the light and dark portions of the intensity patterns, the position of the signal source 330 is adjusted to provide minimum variation in the intensity pattern as the optical fiber 302 is stretched. In other words, if the optical energy introduced into the first end portion 304 from the signal source 330 is in one propagation mode only, there will be no beating between the two modes, and the intensity pattern will not vary as the length of the optical fiber 302 is increased or decreased. Thus, the optical fiber 302 is stretched and released repeatedly as the position of the signal source 330 is gradually adjusted with respect to the centerline of the first end portion 304 of the optical fiber 302. When the optical fiber can be stretched and released with no perceptible change in the observed intensity pattern, substantially all of the $\lambda_2$ optical energy is propagating in one or the other of the two propagation modes. The mode in which the optical energy is propagating can be readily determined by observing the intensity pattern. As illustrated in FIGS. 6a and 6b, the fundamental $LP_{01}$ propagation mode has an intensity pattern that is concentrated in and substantially symmetrical about the center of the optical fiber 302, while the second-order $LP_{11}$ propagation mode has an intensity pattern with two lobes displaced equally from the center of the optical fiber 302, as illustrated in FIGS. 6d and 6e. One can see that the use of an optical fiber or other waveguide having a geometry such as the highly elliptical core is advantageous in enabling the positions of the two optical signal sources to be readily adjusted with respect to the centerline of the core.

After the position of the high power laser light source 320 and the position of the signal source 330 are adjusted with respect to the first end portion 304 of the optical fiber 302, a portion of the optical fiber 302 is formed into the mode stripper 310, and the second end portion 306 is directed at the diffraction grating 322. The apparatus is then operable as described above.

A second embodiment of the present invention is illustrated in FIG. 10 wherein like numbers designate the same elements as were described above in connection with FIG. 7. The elements of FIG. 10 are positioned as in FIG. 7, except there is no diffraction grating in FIG. 10, and the signal source 330 is positioned proximate to the second end portion 306 of the optical fiber 302. The perturbational signal from the high power laser light source 320 propagates in a first direction in the optical fiber 302 from the first end portion 304 to the second end portion 306, as before. However, the optical signal from the signal source 330 is introduced into the second end portion 306 and propagates in a second opposite direction from the second end portion 306 to the first end portion 304. The optical energy from the signal source 330 is emitted from the first end portion 304 and is directed by the beam splitter 322 towards a $\lambda_2$ detector 360. In the apparatus in FIG. 10, the position of the high power laser light source 320 with respect to the first end portion 304 of the optical fiber 302 is adjusted as before prior to forming the mode stripper 310. The position of the signal source 330 is adjusted so that a large portion of the optical energy introduced into the second end portion 306 is introduced in the fundamental $LP_{01}$ propagation mode. However, it is not necessary to accurately adjust the position of the signal source 330 with respect to the second end portion 306 so that the optical energy introduced into the second end portion is only n the $LP_{01}$ propagation mode. Rather, substantially all of the optical energy introduced into the second end portion 306 in the second-order $LP_{11}$ propagation mode is radiated from the optical fiber 302 in the mode stripper 310 so that substantially all of the optical energy propagating towards the first end portion 304 is initially in the fundamental $LP_{01}$ propagation mode. Thus, the position of the signal source 330 with respect to the second end portion 306 can be adjusted after the mode stripper 310 is formed in the optical fiber 302. The proper positioning of the signal source 330 can be obtained by monitoring the output signal emitted from the first end portion 304 and directed onto the $\lambda_2$ detector 360 while adjusting the position of the signal source 330 for maximum detected intensity.

The apparatus of FIG. 10 operates in a similar manner to the apparatus of FIG. 7. When the high power laser light source 320 is not activated, the optical energy from the signal source 330 propagates through the optical fiber 302 substantially unchanged and is emitted from the first end portion 304 in the fundamental $LP_{01}$ propagation mode. The emitted optical energy is represented by an intensity pattern 402 in FIG. 11b. In contrast, when the high power laser light source 320 is activated, the perturbations in the optical fiber 302 caused by the optical Kerr effect cause coupling of optical energy from the fundamental $LP_{01}$ mode to the second-order $LP_{11}$ mode. The optical energy in the LP!1 mode is emitted from the first end portion of the optical fiber 302 and produces an intensity pattern 400, as illustrated in FIG. 11a. Thus, by selectively activating and deactivating the high power laser light source 320, the light introduced into the second end portion 306 from the signal source 330 can be selectively emitted from the first end portion 304 of the optical fiber 302 in either the fundamental $LP_{01}$ propagation mode or the second-order $LP_{11}$ propagation mode. The output from the first end portion 304 can be advantageously provided as an input to additional optical components for further processing.

Since the optical energy from the high power laser light source 320 and the signal source 330 are counterpropagating, it is not necessary that the wavelength $\lambda_2$ of the signal source 330 be different from the wavelength $\lambda_1$ of the high power laser light source 320. Thus, $\lambda_1$ can be equal to $\lambda_2$, and the beat length of the controlling light signal is precisely matched to the beat length of the controlled light signal.

Description of a Dynamic Optical Switch Using a Perturbational Signal Propagating in a Single Spatial Mode Another aspect of the present invention is illustrated in FIG. 12, which is a schematic representation of an apparatus that provides nonlinear optical switching in a two-mode optical waveguide using a perturbational signal that preferably propagates in a single spatial propagation mode. The apparatus of FIG. 12 operates by providing a nonlinear phase shift between two co-propagating spatial modes of an optical signal, as will be described below. The apparatus of FIG. 12 includes a two-mode optical waveguide 400, which is preferably a two-mode optical fiber 400, such as has been described above. For example, as illustrated in FIG. 13, the optical fiber 400 preferably has an inner core 402 having a highly elliptical cross section similar to the inner core 202 of the optical fiber 200 in FIG. 5. The inner core 402 has a major axis 404 and a minor axis 406. The inner core 402 is surrounded by an outer cladding 408 such as the outer cladding 204 of the optical fiber 200 of FIG. 5. (It should be understood that the relative proportions of the core 402 and the cladding 408 are exaggerated in FIG. 13, the cladding 408 having substantially larger relative proportions than shown in an exemplary fiber.) The two-mode optical fiber 400 supports the fundamental $LP_{01}$ spatial propagation mode which has a symmetrical field distribution about the centerline of the inner core, as was illustrated above in connection with FIG. 6c. The two-mode optical fiber 400 also supports the second-order $LP_{11}$ spatial propagation mode which has an anti-symmetrical field distribution about the centerline of the inner core, as was illustrated in connection with FIG. 6f.

The optical fiber 400 includes a first end 410 and a second end 412. The embodiment of FIG. 12 further includes an optical pump source 420 which supplies a high-intensity optical pump signal 422 which is provided as an input to the first end 410 of the optical fiber 400. In an exemplary embodiment of the present invention, the pump signal 422 has a wavelength $\lambda_1$ of approximately 1064 nanometers. For example, the pump signal source 420 is advantageously a Q-switched Nd:YAG laser that provides a 250 nanosecond wide pulse (full width at half maximum) at a repetition rate of 1 kHz. A variable attenuator 424 is advantageously included in the propagation path of the pump signal 422 to selectively attenuate the power of the pump signal 422 provided to the input end 410 of the optical fiber 400.

A probe signal source 430 is also provided. The probe signal source 430 supplies an optical probe signal 432 having a wavelength $\lambda_2$ that is selected to be different from the wavelength $\lambda_1$ of the pump signal 422. For example, in an exemplary embodiment of the present invention, the probe signal 432 has a wavelength $\lambda_2$ of approximately 633 nanometers. For example, the probe signal source 430 is advantageously a cw Helium-Neon laser, or the like.

In this aspect of the invention, the probe signal 432 is the signal that is to be controlled or modulated, and the pump signal 422 is the perturbational signal that controls the probe signal 432. As will described below, an optical output signal is derived from the probe signal 432, and the pump signal 422 can be selectively activated to switch an optical output signal between a first state (an "on" state) and a second state (an "off" state).

In an exemplary preferred embodiment of the present invention, the optical fiber 400 is a 33-meter length of optical fiber having an elliptical core with a major axis length of 2.5 microns and a minor axis length of 1.25 microns. The exemplary optical fiber 400 has a cutoff wavelength of 670 nanometers for the second-order spatial propagation mode. Thus, the optical fiber 400 supports both the fundamental $LP_{01}$ propagation mode and the second-order $LP_{11}$ propagation mode at the 633-nanometer Wavelength $\lambda_2$ of the probe signal 432, but supports only the fundamental $LP_{01}$ propagation mode at the 1064-nanometer wavelength $\lambda_1$ of the pump signal 422.

Both the pump signal 422 and the probe signal 432 are provided as inputs to the first end 410 of the optical fiber 400. In the illustrated embodiment, a dichroic optical beam splitter 440 is interposed between the probe signal source 430 and the first end 410 of the optical fiber 400. The beam splitter 440 is selected to pass optical signals at the probe wavelength $\lambda_2$ so that the probe signal 432 preferably passes through the beam splitter 440 without significant attenuation. The beam splitter 440 is further selected to be substantially reflective at the pump wavelength $\lambda_1$ so that substantially all the pump signal 422 incident on the beam splitter 440 is reflected by the beam splitter 440. Thus, as illustrated in FIG. 12, probe signal source 430 is positioned in alignment with the first end 410 of the optical fiber 400 so that the probe signal 432 passes through the beam splitter 440 along a first direction line 442 and is incident on the first end 410. The beam splitter 440 is oriented at a 45° angle to the first direction line 442. In the embodiment illustrated in FIG. 12, the pump signal source 420 is aligned so that the pump signal 422 is directed along a second direction line 444 that is perpendicular to the first direction line 442. The pump signal 422 is incident on the beam splitter 440 at a 45° angle and is thus reflected therefrom at a 45° angle along the first direction line 442 toward the input end 410 of the optical fiber 400. Thus, the beam splitter 440 operates to direct both the pump signal 422 and the probe signal 432 toward the input end 410 of the optical fiber 400 as a combined optical input signal 446 having both the pump wavelength $\lambda_1$ and the probe wavelength $\lambda_2$.

The embodiment of FIG. 12 further includes an optical polarizer 450 that is interposed between the beam splitter 440 and the input end 410 of the optical fiber 400 so that the combined optical signal 446, comprising the pump signal 422 and the probe signal 432, passes through the polarizer 450 before entering the input end 410. The polarizer 450 preferably has a pair of polarization axes such that the polarizer 450 selectively blocks light along one of the two axes and transmits light along the other of the two axes. In the preferred embodiment, the two polarization axes of the polarizer 450 are oriented so that the light transmitted by the polarizer 450 is polarized along one of the two axes (e.g., the minor axis) of the elliptical core of the optical fiber 400. The polarized output of the polarizer 450 propagates as a polarized input signal 452, comprising the pump wavelength $\lambda_1$ and the probe wavelength $\lambda_2$, toward the input end 410 of the optical fiber 400.

In the exemplary embodiment illustrated in FIG. 12, a lens 460 (e.g., a 20-power microscope objective, or the like) is interposed between the polarizer 450 and the input end 410 to focus the polarized input signal 452 onto the inner core of the optical fiber 400. Since the polarized input signal 452 is polarized by the polarizer 450, the light focused onto the core of the optical fiber 400 propagates in one polarization mode of the optical fiber 400. Because of the highly elliptical geometry of the core of the optical fiber 400, both the pump signal 422 and the probe signal 432 are maintained in the same polarization mode along the entire length of the optical fiber 400. Although the pump signal 422 and the probe signal 432 have been combined and polarized, as discussed above, the two optical signals propagating within the optical fiber 400 will also be referred to hereinafter as the pump signal 422 and the probe signal 432, and it should be understood that references to the pump signal 422 and the probe signal 432 within the fiber 400 are references to the polarized signals and not the signals at the respective sources.

The pump signal source 422 is preferably aligned with respect to the core 402 of the optical fiber 400 so that substantially all of the pump signal 422 is introduced in the symmetrical fundamental $LP_{01}$ propagation mode of the optical fiber 400. The probe signal source 430 is preferably aligned so that it is offset from the centerline of the core of the optical fiber 400 in such a way that both the fundamental $LP_{01}$ spatial propagation mode and the second-order $LP_{11}$ spatial propagation mode are excited with approximately equal power. In the preferred embodiment, the pump signal 422 has a greater intensity than the probe signal 432.

The second end 412 of the optical fiber 400 provides an optical output signal 470 having characteristics that will be discussed more fully below. The optical output signal 470 is directed toward an optical detector 472 (e.g., a photodetector, or the like) which is positioned in alignment with the second end 412 so that the optical output signal 470 exiting the second end 412 is incident upon the optical detector 472. As known in the art, the optical detector 472 provides an electrical output signal on a line 474 that is responsive to the intensity of the optical output signal 470 incident upon the optical detector 472. The electrical output signal on the line 474 is advantageously amplified, e.g., by an amplifier 476, and the amplified output signal is provided to external electronic circuitry. For example, in FIG. 12, the output of the amplifier 476 is electrically connected to the input of an oscilloscope 478 so that the detected intensity of the optical output signal can be measured.

An optical filter 480 is positioned between the second end 412 of the optical fiber 400 and the optical detector 470 so that optical output signal 470 exiting from the second end 412 passes through the optical filter 480 before being incident upon the optical detector 472 as a filtered output signal 482. Preferably, the optical filter 480 is a narrow bandpass filter that transmits substantially all light incident on it having the probe wavelength $\lambda_2$ of approximately 633 nanometers. The pass band of the filter 480 is sufficiently narrow so that it blocks substantially all light having the pump wavelength $\lambda_1$ of approximately 1064 nanometers. Thus, only the component of the optical output signal 470 having the probe wavelength $\lambda_2$ passes through the filter 480 and is incident on the optical detector 472 as the filtered output signal 482. Thus, the electrical output of the optical detector 472 on the line 474 is responsive to the intensity of only the component of the optical output signal 470 having the probe wavelength $\lambda_2$.

As further illustrated in FIG. 12, an optical mask 490, comprising a light-blocking material, is positioned between the second end 412 of the optical fiber 400 and the optical filter 480 in the path of the optical output signal 470. The optical mask 490 is positioned in the path of the optical output signal 470 so that it blocks approximately half of the optical signal path between the second end 412 and the optical filter 480. This is illustrated more clearly in FIG. 13 which is a view of the mask 490 taken along the lines 13—13 in FIG. 12. As illustrated, the mask 490 preferably has a substantially straight upper edge 492 that is generally aligned with the minor axis 406 of the elliptical core 402 of the optical fiber 400. The purpose of the mask 490 will be explained more fully below.

In the exemplary embodiment illustrated in FIG. 12, a first output lens 494 is provided between the second end 412 of the optical fiber 400 and the mask 490. The first output lens has the effect of concentrating the output signal 470 and directing the output signal 470 toward the optical detector 472. The embodiment also advantageously includes a second output lens 496 which is positioned between the optical filter 480 and the optical detector 472 to focus the filtered output signal 482 onto the active portion of the optical detector 472.

As previously discussed, the optical Kerr effect causes the effective refractive index of an optical waveguide to change in response to high intensity light energy propagating in the optical waveguide. The present invention utilizes the optical Kerr effect to provide a dynamic switch for selectively switching the optical output signal derived from the probe signal 432 on and off in response to the optical pump signal 422.

As was discussed above in connection with the embodiment of FIGS. 7–11$b$, an optical signal propagating through an optical waveguide in two spatial propagation modes will have an optical beat length that depends upon the differential effective refractive indices between the two modes. The optical beat length causes the optical signal to have distinctive optical intensity distribution patterns that vary in accordance with the phase difference between the two spatial propagation modes. The optical intensity distribution patterns were illustrated above in FIGS. 9$a$–9$i$ for a pump signal propagating in the fundamental $LP_{01}$ and second-order $LP_{11}$ modes. Similar distribution patterns also occur in the optical fiber 400 when the probe signal 432 propagates in the two modes. However, in the present invention, the intensity of the probe signal 432 is maintained at a sufficiently low level that the effect of the intensity on the effective refractive indices of the optical fiber 400 is insignificant compared to that of the pump signal 422.

The present invention operates by first adjusting the length of the optical fiber 400 between the first end 410 and the second end 412 while only the probe signal 432 is provided as an input to the first end 410. The length of the optical fiber 400 is adjusted so that the optical intensity distribution pattern of the output optical signal 470 exiting from the second end 412 has a maximum contrast as detected, for example, on a screen or other means for observing the optical intensity distribution pattern. For example, a short section 500 of the optical fiber 400 can be stretched by conventional biasing techniques to selectively adjust the overall length of the optical fiber 400 so that the optical output signal 470 has an optical intensity distribution pattern such as was illustrated above in FIGS. 9a, 9e or 9i, or an optical intensity distribution pattern such as was illustrated in FIGS. 9c or 9g. These optical intensity distribution patterns correspond to optical phase differences between the two modes of the probe signal 432 of $N\pi$ (N=0, 1, 2, ...). As set forth above, these high contrast optical intensity distribution patterns occur because the symmetric $LP_{01}$ mode adds constructively to the antisymmetric $LP_{11}$ mode on one-half of the radiation pattern to cause the bright lobe of the optical intensity distribution pattern and adds destructively on the other half to cause the dark lobe of the optical intensity distribution pattern. Thus, by varying the differential phase shift between the two modes, the positions of the bright lobe and the dark lobe are interchanged. See, for example, FIGS. 9c and 9e, above, wherein the bright lobe is represented by the solid ellipse and the dark lobe is represented by the lack of the solid ellipse. Also see FIG. 13, wherein an upper lobe 510 is illustrated as a solid ellipse to indicate a relatively bright lobe and a lower lobe 512 is illustrated (in phantom) to indicate a relatively dark lobe.

The relative positions of the bright and dark lobes with respect to the major axis of the core 402 of the optical fiber 400 as indicated by the optical intensity distribution pattern can be adjusted by varying the length of the optical fiber 400 as is accomplished during the adjusting step described above. Thus, the length of the optical fiber 400 is adjusted to statically bias the intensities of the two lobes. In the present invention, the positions of the bright and dark lobes are controlled by the pump signal 422 to provide a dynamic on-off switching action. The pump signal 422 thus acts as a perturbational signal.

As set forth above, the pump signal 422 propagates in the optical fiber 400 in the fundamental $LP_{01}$ spatial propagation mode. The pump signal 422 has a sufficiently high intensity that the optical Kerr effect occurs causing the effective refractive indices of the optical fiber 400 to change. However, since the pump signal 422 is propagating only in the fundamental $LP_{01}$ mode of the optical fiber 400, the optical energy distribution of the pump signal 422 overlaps the $LP_{01}$ mode of the probe signal 432 more than it overlaps the $LP_{11}$ mode of the probe signal 432. Thus, the optical Kerr effect has a greater effect on the effective refractive index of the fundamental $LP_{01}$ mode than on the effective refractive index of the second-order $LP_{11}$ mode. This differential effect on the effective refractive indices for the two modes has the same effect as changing the length of the $LP_{01}$ mode propagation path with respect to the length of the LPII mode propagation path of the optical fiber 400. Thus, an additional phase difference is introduced between the $LP_{01}$ mode component and the $LP_{11}$ mode component of the probe signal 432. The introduction of the additional phase difference has the effect of causing the optical intensity distribution pattern of the output signal 470 to change from the original high contrast pattern to which it was initially adjusted to a different optical intensity distribution pattern. The intensity of the pump signal 422 is preferably selected to cause an additional $\pi$ differential phase shift to be introduced so that the positions of the bright lobe and the dark lobe are interchanged when the pump signal 422 is active.

The purpose of the optical mask 490 can now be understood. As illustrated in FIG. 13, output signal 470 exiting from the inner core 402 of the optical fiber 400 has the upper lobe 510 and the lower lobe 512 (shown in phantom). When the length of the optical fiber 400 is adjusted as discussed above, and the pump signal source 420 is inactive so that the pump signal 422 is not propagating in the optical fiber 400, the optical intensity distribution pattern of the output signal 422 is concentrated in one of upper lobe 510 or the lower lobe 512. For the purposes of the discussion it is assumed that the length of the optical fiber 400 is initially adjusted so that the light is in the upper lobe 510 as represented by the solid ellipse in FIG. 13. As set forth above, the mask 490 is positioned with its upper edge 492 generally aligned with the minor axis 406 of the elliptical core 402 of the optical fiber 400. This has the desired effect of permitting the light in the upper lobe 510 to bypass the mask 490 and propagate to the optical detector 472, via the optical filter 480 and the second output lens 496, causing the optical detector 472 to provide an electrical output signal on the line 474 responsive to the detected light. Any light in the lower lobe 512 is blocked by the mask 490. Thus, when the differential phase delay is varied by activating the pump source 420 to cause the pump signal 422 to be introduced into the input nd 410 of the optical fiber 400, the light in the output signal 470 is switched to the lower lobe 512 and is blocked by the mask 490 so that substantially less light propagates to the optical detector 472. Thus, the electrical output signal on the line 474 changes to indicate that the intensity of the detected light has decreased. As set forth above, the optical filter 480 blocks light at the pump wavelength $\lambda_1$ so that only the phase controlled light at the probe wavelength $\lambda_2$ is incident upon the optical detector 472.

It can be seen that if the length of the optical fiber 400 is initially adjusted so that the optical intensity is initially in the lower lobe 512 before the activation of the pump source 420, then the activation of the pump signal 422 will cause the light to switch from the lower lobe 512 to the upper lobe 510. Thus, by choosing which of the two lobe patterns is bright in the absence of the pump signal 422 (i.e., by adjusting the static biasing of the optical fiber 400), the activation of the pump signal 422 can cause the optical signal detected by the detector 472 to switch from "on" to "off" or from "off" to "on."

The foregoing is illustrated graphically in FIGS. 14a–c, 15a–c, and 16a–c. FIG. 14a illustrates the power in the Q-switched pump signal 422 (FIG. 12) as a function of time as represented by a curve 520. As illustrated by the curve 520, the power of the pump signal 422 provided by the exemplary Q-switched Nd:YAG laser source 420 has a maximum intensity $P_\pi$ of approximately 1.6 watts and has a full width at half magnitude of approximately 250 nanoseconds. The magnitude $P_\pi$ is the intensity of the pump
signal 422 that causes a $\pi$ differential phase shift in the two propagation modes, as described above.

FIG. 14b illustrates the power in the upper lobe 510 (FIG. 13) of the output signal 470 as detected by the optical detector 472. Thus, a curve 530 in FIG. 14b represents the amplitude of the electrical output signal on the line 474 (FIG. 12) which is proportional to the intensity of the detected output signal 470. Since the bandpass filter 480 blocks the light having the pump wavelength $\lambda_1$, the portion of the optical output signal detected by the optical detector 472 corresponds to the power in the upper lobe 510 at the pump wavelength $\lambda_1$. Thus, assuming that the length of the optical fiber 400 is initially adjusted for maximum contrast with the optical energy concentrated in the upper lobe 510, the curve 530 has a maximum magnitude when the pump signal 422 is inactive (i.e., when the curve 520 in FIG. 14b has a minimum magnitude). When the magnitude of the pump signal 422 increases at the beginning of each 250-nanosecond pump pulse, as represented by a increasing magnitude portion 540 on the curve 520 in FIG. 14a, there is a corresponding decrease in the intensity of the output signal 472 in the upper lobe 510, as represented by a decreasing magnitude portion 542 on the curve 530 in FIG. 14b. Since there is an optical propagation delay in the 33-meter length of optical fiber 400 and an electrical propagation delay in the optical detector 472 and associated detection electronics, the decreasing magnitude portion 542 of the curve 530 is delayed in time with respect to the increasing magnitude portion 540 of the curve 520.

It can be seen from FIGS. 14a and 14b that as the magnitude of the pump signal increases the magnitude of the pump signal 422 increases, the magnitude of the output signal 470 in the upper lobe 510 decreases. As discussed above, this decrease in the intensity of the detected signal in the upper lobe 510 is caused by the increasing phase difference between the portions of the probe signal 432 propagating in the fundamental $LP_{01}$ propagation mode and the second-order $LP_{11}$ propagation mode. The increasing phase difference is caused by differential changes in the effective refractive indices in the $LP_{01}$ propagation mode and the $LP_{11}$ propagation mode caused by the optical Kerr effect as the intensity of the pump signal 422 increases. The increasing phase difference causes more of the optical intensity to appear in the lower lobe 512 (FIG. 13) of the optical intensity distribution pattern and less of the optical intensity to appear in the upper lobe 510. When the pump signal is at its maximum magnitude, as indicated by a peak 544 on the curve 520 in FIG. 14a, an additional $\pi 0$ phase difference has been introduced, causing substantially all of the optical intensity to appear in the lower lobe 512 of the optical intensity distribution pattern and little, if any, of the optical energy to appear in the upper lobe 510, as indicated by a minimum 550 in the curve 530 of FIG. 14b.

When the pump signal 422 begins decreasing, as indicated by a decreasing portion 552 on the curve 520 of FIG. 14a, the additional phase difference begins decreasing, causing a portion of the probe signal 432 to begin appearing in the upper lobe 510 and thus causing in increase in the magnitude of the detected optical signal, as represented by an increasing portion 554 of the curve 530 in FIG. 14b.

FIG. 14c illustrates the effect of the pump signal 422 when the optical fiber 400 is initially biased so that substantially all of the optical intensity of the output signal 470 is concentrated in the lower lobe 512. As set forth above, the intensity of the pump signal 422 is represented by the curve 520 in FIG. 14a. In FIG. 14c, the output intensity in the upper lobe 510 is initially at a minimum magnitude, as represented by the initial portion of a curve 570. When the intensity of the pump signal 422 increases, the increasing phase difference causes a portion of the output signal 470 to begin appearing in the upper lobe 510, as indicated by an increasing portion 572 of the curve 570. When the pump signal 422 is at its maximum magnitude, as represented by the maximum 544 of the curve 520, the intensity of the output signal 532 in the upper lobe 510 is at a maximum magnitude, as represented by a maximum or peak 574 of the curve 570 in FIG. 14c. The decrease in the magnitude of the pump signal 422 at the end of the pump pulse, as represented by the decreasing portion 552 of the curve 520, causes a corresponding decrease in the magnitude of the optical intensity in the upper lobe 510, as represented by a decreasing portion 576 of the curve 570 in FIG. 14c.

When the peak intensity of the pump signal 422 is increased beyond $P_\pi$, the probe signal 432 becomes overmodulated. That is, the change in the effective refractive index of the fundamental $LP_{01}$ propagation mode of the optical fiber 400 for the probe signal 432 increases with continued increase in the magnitude of the pump signal 422. Thus, the phase difference between the two propagation modes of the probe signal 432 will continue to increase. However, the increase in the phase difference from a phase difference of has the same effect on the optical intensity distribution pattern as an decrease in the phase difference from a phase difference of $\pi$. Thus, an increase in the pump power beyond the magnitude necessary to cause a $\pi$ phase difference causes the optical intensity distribution pattern to change back toward the initial pattern. This is illustrated in FIGS. 15a and 15b for the initial condition where substantially all of the intensity of the output signal 470 at the probe wavelength $\lambda_2$ is concentrated in the upper lobe 510. Thus, as illustrated by a curve 580 in FIG. 15b, the intensity of the detected signal initially is at a maximum value. A curve 582 in FIG. 15a represents the intensity of the pump signal 422 (FIG. 12) in which the maximum magnitude of the pump signal 422 is approximately twice the magnitude of the pump signal 422 represented by the curve 520 in FIG. 14a. The maximum magnitude is represented as $2P_\pi$. The curve 582 has an increasing portion 584, corresponding to an increase in the magnitude of the pump signal 422; a peak or maximum 586, corresponding to the maximum magnitude of the pump signal 422; and a decreasing portion 588, corresponding to a decrease in the magnitude of the pump signal 422. The increasing portion 584 and the decreasing portion 588 of the curve 582 pass through a magnitude $P_\pi$ represented by a dashed line 590 which corresponds to the maximum magnitude of the pump signal 422 discussed above in connection with FIG. 14a. Thus, the increasing portion 584 has a first increasing segment 584a below the $P_\pi$ line 590, a second increasing segment 584b above the $P_\pi$ line 590, and an intersection 584c with the $P_\pi$ line 590. The decreasing portion 588 has a first decreasing segment 588a above the $P_\pi$ line 590, a second decreasing segment 588b below the $P_\pi$ line 590, and an intersection 588c with the $P_\pi$ line 590. The peak or maximum 586 of the curve 582 has a magnitude of $2P_\pi$ corresponding to a peak magnitude of the pump signal 422 that is twice the magnitude of the pump signal 422 discussed above in connection with FIG. 14a.

As illustrated in FIG. 15b, the curve 580 has a first decreasing portion 592 that corresponds to the first increasing segment 584a of the curve 582. When the pump signal 422 reaches approximately half of its maximum magnitude (i.e., $P_\pi$, as illustrated by the intersection 584c of the increasing portion 584 of the pump curve 582 with the dashed line 590), substantially all of the intensity of the output signal 470 at the probe wavelength $\lambda_2$ appears in the lower lobe 512 and the curve 580 has first minimum 594. Thereafter, as the pump signal 422 continues to increase toward its maximum magnitude $2P_\pi$ along the second increasing segment 584b, the curve 580 has a first increasing portion 596 that is caused by the appearance of a portion of the intensity of the output signal 470 in the upper lobe 510. The intensity of the detected output signal 470 in the upper lobe continues to increase until the magnitude of the pump signal 422 increases to approximately $2P_\pi$ (i.e., the peak or maximum 586 of the curve 582) which causes an additional phase difference of $2\pi$, at which time substantially all of the output signal at the probe wavelength $\lambda_2$ appears in the upper lobe, as indicated by a maximum 598 in the curve 580. Thereafter, as the intensity of the pump signal 422 decreases, as indicated by the first decreasing segment 588a of the curve 582, the curve 580 has a second decreasing portion 600; a second minimum 602 corresponding to the intersection 588c of the decreasing portion 588 of the curve 582 with the line 590; and a second increasing portion 604, corresponding to the second decreasing segment 588b of the curve 582. Thus, it can be seen that by overmodulating the probe signal 432 with a pump signal 422 having a magnitude that is twice the magnitude needed for 100% modulation, the detected portion of the output signal 470 has two pulses for each pump pulse.

It should be understood that a corresponding pair of increasing pulses can be provided in the output signal 470 by biasing the optical fiber 400 so that the intensity of the output signal 470 at the probe wavelength $\lambda_2$ is initially concentrated in the lower lobe 512. This is illustrated by a curve 620 in FIGS. 15c, which initially has a low magnitude. The curve 620 has a first increasing portion 622, corresponding to the first increasing segment 584a of the curve 582; a first peak or maximum 624, corresponding to the intersection 584c of the increasing portion 584 of the curve 582 with the $P_\pi$ line 590; a first decreasing portion 626, corresponding to the second increasing segment 584b of the curve 582; a first minimum 628, corresponding to the peak 586 of the curve 582; a second increasing portion 630, corresponding to the first decreasing segment 588a of the curve 582; a second peak 632, corresponding to the intersection 588c; and a second decreasing portion 634, corresponding to the second decreasing segment 588b of the curve 582.

FIGS. 16a, 16b and 16c illustrate the effect of increasing the maximum magnitude of the pump signal 422 to approximately $3P_\pi$. A curve 650 in FIG. 16a represents the magnitude of the pump signal 422. As illustrated, the curve 650 has an increasing portion 652 comprising a first increasing segment 652a between the minimum magnitude and the intersection 652b of the increasing portion 652 with a dashed line 654 that corresponds to a pump signal intensity of $P_\pi$; a second increasing segment 652c, between the intersection 652b with the $P_\pi$ line 654 and an intersection 652d with a dashed line 656 that corresponds to a pump signal intensity of $2P_\pi$; and a third increasing segment 652e between the $2P_\pi$ line 656 and a peak or maximum 658, corresponding to a pump signal intensity of $3P_\pi$. The curve 650 further includes a decreasing portion 660 that comprises a first decreasing segment 660a between the peak 658 and an intersection 660b with the $2P_\pi$ line 656; a second decreasing segment 660c between the intersection 660b with the $2P_\pi$ line 656 and an intersection 660d with the $P_\pi$ line 654; and a third decreasing segment 660e between the intersection 660d with the $P_\pi$ line 654 and the minimum magnitude.

A curve 670 in FIG. 16b represents the intensity of the output signal 470 in the upper lobe 510 at the probe wavelength $\lambda_2$ in response to the pump signal represented by the curve 650 of FIG. 16a. The curve 670 has an initial maximum magnitude to indicate that the optical fiber 400 is initially biased so that substantially all of the intensity of the output signal 470 at the probe wavelength $\lambda_2$ is concentrated in the upper lobe 510. The curve 670 has a first decreasing portion 672, corresponding to the first increasing segment 652a of the curve 650; a first minimum 674, corresponding to the intersection 652b of the increasing portion 652 with the $P_\pi$ line 654; a first increasing portion 676, corresponding to the second increasing segment 652c; a first peak 678, corresponding to the intersection 652d of the increasing portion 652 with the $2P_\pi$ line 656; a second decreasing portion 680, corresponding to the third increasing segment 652e; and a second minimum, corresponding to the peak 658. The curve 670 further comprises a second increasing portion 684, corresponding to the first decreasing segment 660a; a second peak or maximum 686, corresponding to the intersection 660b of the decreasing portion 660 with the $2P_\pi$ line 656; a third decreasing portion 688, corresponding to the second decreasing segment 660c; a third minimum 690, corresponding to the intersection 660d of the decreasing portion 660 with the $P_\pi$ line 654; and a third increasing portion 692, corresponding to the third decreasing segment 660e.

A curve 700 in FIG. 16c represents the intensity of the output signal 470 in the upper lobe 510 at the probe wavelength $\lambda_2$ in response to the pump signal represented by the curve 650 of FIG. 16a when the optical fiber is initially biased so that substantially all of the intensity of the output signal 470 at the probe wavelength $\lambda_2$ is concentrated in the lower lobe 510. Thus, the curve 700 has an initial minimum magnitude. The curve 700 has a first increasing portion 702, corresponding to the first increasing segment 652a of the curve 650; a first maximum 704, corresponding to the intersection 652b of the increasing portion 652 with the $P_\pi$ line 654; a first decreasing portion 706, corresponding to the second increasing segment 652c; a first minimum 708, corresponding to the intersection 652d of the increasing portion 652 with the $2P_\pi$ line 656; a second increasing portion 710, corresponding to the third increasing segment 652e; and a second peak or maximum, corresponding to the peak 658. The curve 700 further comprises a second decreasing portion 714, corresponding to the first decreasing segment 660a; a second minimum 716, corresponding to the intersection 660b of the decreasing portion 660 with the $2P_\pi$ line 656; a third increasing portion 718, corresponding to the second decreasing segment 660c; a third peak or maximum 720, corresponding to the intersection 660d of the decreasing portion 660 with the $P_\pi$ line 654; and a third decreasing portion 722, corresponding to the third decreasing segment 660e.

It can be seen from FIGS. 16a, 16b and 16c that by tripling the maximum pump power from $P_\pi$ to $3P_\pi$, the intensity of the optical output signal 470 concentrated in the upper lobe 510 is caused to have three pulses for each pulse of the pump signal 422.

The foregoing description of the operation of this aspect of the present invention was based upon the experimental embodiment wherein the pump signal 422 was provided as a series of short pump pulses. However, it should be understood that the pump signal 422 can be provided as longer pulses or as static signal levels to provide longer output pulses or static output conditions. It can be seen that this aspect of the present invention can be advantageously used in optical logic switches, or other such devices, wherein the pump signal 422 is a controlling signal and the probe signal 432 is the controlled signal.

The above-described operation of the present invention can be understood by referring to the following mathematical analysis. Assuming once again that the intensity of the probe signal 432 is much less than the intensity of the pump signal 422, and further assuming that the field distributions of the waveguide modes are independent of the intensities of the modes, it can be shown that the differential phase shift $\delta\phi$ between the two propagation modes of the probe signal 432 induced by the pump signal 422 is given by:

$$\delta\phi = \frac{96\pi^2 \omega \chi L P}{c^2 n^2} \left( \frac{1}{A_1} - \frac{1}{A_2} \right) \times 10^7 \qquad (6)$$

where $\omega$ is the angular frequency of the probe field, $\chi$ is the real part of the third-order nonlinear susceptibility, L is the length of the optical fiber 400, P is the pump power in watts, c is the speed of light, and n is the average index of refraction of the optical fiber 400. In Equation (6), the fiber loss is assumed to be negligible and the terms $A_1$ and $A_2$ are the effective interaction areas given by the following integrals:

$$A_1 = \frac{\int \Psi_1^2 r dr d\Phi \int \Psi_p^2 r dr d\Phi}{\int \Psi_1^2 \Psi_p^2 r dr d\Phi} \qquad (7)$$

$$A_1 = \frac{\int \Psi_2^2 r dr d\Phi \int \Psi_p^2 r dr d\Phi}{\int \Psi_2^2 \Psi_p^2 r dr d\Phi} \qquad (8)$$

where $\Psi_1$ represents the symmetric field distribution of the fundamental $LP_{01}$ propagation mode of the probe signal 432, $\Psi_2$ represents the anti-symmetric field distribution of the second-order $LP_{11}$ propagation mode of the probe signal 432, and $\Psi_p$ represents the field distribution of the pump signal 422 in the fundamental $LP_{01}$ propagation mode. In Equations (7) and (8), the integrations are over the entire cross section of the optical fiber 400. From Equations (6), (7) and (8), the pump power $P_\pi$ required to produce a differential phase shift, corresponding to 100% switching from the upper lobe pattern to the lower lobe pattern, or vice versa, can be calculated as follows:

$$P_\pi = \frac{c^2 n^2}{96\pi \omega \chi L} \left( \frac{1}{A_1} - \frac{1}{A_2} \right)^{-1} \times 10^{-7} \qquad (9)$$

where $P_\pi$ is in watts.

A theoretical estimation of $P_\pi$ can be obtained for the exemplary optical fiber 400 by first using Gaussian beam mode approximations for an equivalent step-index circular core optical fiber having the same $LP_{11}$ mode cutoff wavelength of approximately 670 nanometers. $\Psi_1$ and $\Psi_p$ can be calculated to be approximately equal to:

$$\exp(-r^2/\omega^2),$$

and $\Psi_2$ can be calculated to be approximately equal to:

$$(r/w)\exp(-r_2/\omega_2)\sin\theta,$$

where $\omega$ is the mode field radius expressed in terms of the core radius a and the normalized frequency V. Using the information derived from the circular core fiber model, the power $P_\pi$ was estimated by substituting one-half the length of the minor axis of the core. In this estimate, using a refractive index n of 1.46, $\chi$ equal to $3.5 \times 10^{-15}$ esu (electrostatic units) for silica, and a equal to 0.625 microns (one-half the length of the minor axis of the elliptical core 402 of the optical fiber 400), $P_\pi$ was calculated to be approximately 1.8 watts which was comparable to the observed experimental magnitude of approximately 1.6 watts.

Various embodiments of the present invention have been described above. Although the invention has been described with reference to these specific embodiments, the descriptions are intended to be illustrative of the invention and are not intended to be limiting. Referring to FIG. 12, for example, it should be understood by one skilled in the art that means other than the illustrated bulk optic components can be used to construct the apparatus of the present invention. For example, an offset optical fiber splice can be used to couple light from a selected lobe of the optical intensity distribution pattern of the two-mode optical fiber 400 to a single-mode optical fiber. Such a splice is illustrated, for example, in copending U.S. patent application Ser. No. 017,882, filed on Feb. 20, 1987, and assigned to the assignee of the present application. Various other modifications and applications will be apparent to those skilled in the art.

What is claimed is:

1. An apparatus for controlling an optical signal, comprising:
    an optical waveguide segment having first and second spatial propagation modes, said first and second modes having first and second indices of refraction, respectively; and
    a perturbational signal source coupled to introduce a perturbational signal into at least one of said spatial modes to optically perturb at least one of said first and second indices of refraction, said perturbational signal controllably varying the spatial intensity distribution of said optical signal.

2. The apparatus of claim 1, wherein (i) said second spatial mode is a higher order mode than said first spatial mode and (ii) the optical waveguide has a non-circular cross section having cross-sectional dimensions selected such that the waveguide guides light in the higher order mode in only a single stable intensity pattern.

3. The apparatus of claim 1, wherein the perturbation of said at least one of the effective refractive indices phase shifts an optical signal component propagating in one of said first and second modes.

4. The apparatus of claim 3, wherein said tonal signal source varies the intensity of said perturbational signal to vary said phase shift.

5. The apparatus of claim 1, wherein said optical waveguide segment has an optical intensity distribution pattern caused by the phase relationship between light propagating in said first and second modes, said optical intensity distribution pattern having at least two lobes, and wherein said apparatus further includes a mask for blocking light propagating in one of said two lobes.

6. An apparatus for controlling an optical signal, comprising:

an optical waveguide comprising a light propagation medium that supports at least first and second spatial propagation modes, said optical waveguide having a first effective refractive index for light propagating in said first spatial propagation mode and a second effective refractive index, said second effective refractive index different from said first effective refractive index, for light propagating in said second spatial propagation mode so that light propagating in one of said modes propagates at a phase propagation velocity that is different from the phase propagation velocity of light propagating in the other of said modes;

an optical signal- source that supplies a first optical input signal to said optical waveguide at a first optical wavelength, said first optical wavelength selected so that said first optical input signal has a first spatial mode component that propagates in said optical waveguide in said first spatial propagation mode and a second spatial mode component that propagates in said second spatial propagation mode, said first spatial mode- component being shifted in phase with respect to said second spatial mode component as said first optical input signal propagates in said optical waveguide; and a perturbational signal source that supplies a second optical input signal to said optical waveguide at a second optical wavelength, said second optical wavelength selected so that said second optical input signal propagates in said optical waveguide in at least said first spatial propagation mode, said second optical input signal having an intensity that is selectable to perturb said first effective refractive index relative to said second effective refractive index to change the amount by which said first spatial propagation mode component of said first optical input signal is shifted in phase with respect to said second spatial mode component of said first optical input signal as said first and second spatial propagation mode components propagate in said optical waveguide.

7. The apparatus for controlling an optical signal, as defined in claim 6, wherein said first wavelength is less than said second wavelength.

8. The apparatus for controlling an optical signal, as defined in claim 6, wherein said first spatial propagation mode is the fundamental $LP_{01}$ propagation mode wherein said second spatial propagation mode is the second-order $LP_{11}$ propagation mode.

9. The apparatus for controlling an optical signal, as defined in claim 6, wherein said optical waveguide is a two-mode optical fiber having an elliptical core.

10. The apparatus for controlling an optical signal, as defined in claim 6, wherein:

said optical waveguide is a two-mode optical fiber; said first spatial mode of said waveguide is the fundamental $LP_{01}$ spatial propagation mode of said optical fiber and said second spatial mode of said waveguide is the second-order $LP_{11}$ spatial propagation mode of said optical fiber;

substantially all the light of said second optical input signal propagates in the fundamental $LP_{01}$ spatial propagation mode of said optical fiber; and the light of said first optical signal propagates substantially equally in said fundamental $LP_{01}$ spatial propagation mode and said second-order $LP_{11}$ propagation mode of said optical fiber.

11. The apparatus for controlling an optical signal, as defined in claim 6, wherein the phase relationship between the first spatial mode component and the second spatial mode component of said first optical input signal produces an intensity distribution pattern having at least first and second lobes, the intensity of the light in said first and second lobes at said first wavelength varying in accordance with the phase relationship between said first spatial mode component and said second spatial mode component, said apparatus further including means for detecting the intensity of the light in one of said first and second lobes at said first wavelength, said intensity varying in accordance with the intensity of said second optical input signal.

12. The apparatus for controlling an optical signal, as defined in claim 11, wherein said means for detecting light in said one of said first and second lobes at said first wavelength includes an optical detector and means for preventing light from the other of said first and second lobes from being detected by said detector.

13. The apparatus for controlling an optical signal, as defined in claim 12, wherein said means for preventing light from the other of said first and second means from being detected by said optical detector is a blocking mask positioned between said other of said first and second lobes and said optical detector.

14. The apparatus for controlling an optical signal, as in claim 13, further including means for preventing light at said second wavelength from reaching said optical detector.

15. The apparatus for controlling an optical signal, as defined in claim 14, wherein said means for preventing light at said second wavelength from reaching said optical detector is an optical filter.

16. The apparatus for controlling an optical signal, as in claim 6, wherein said optical waveguide has a length between an input end and an output end that is selected so that at said output end said first spatial mode component and said second spatial mode component of said first optical input signal have a relative phase difference of $N\pi$, for N equal to an integer (0, 1, 2, 3, . . . ), such that substantially all of the light intensity at said first wavelength is concentrated in a first lobe of an optical intensity distribution pattern at said output end when said second input signal has a first low intensity and such that light intensity in said first lobe decreases when said intensity of said second input signal increases.

17. The apparatus for controlling an optical signal, as defined in claim 16, further including means for detecting the intensity of the light in a selected one of said first and second lobes.

18. An optical mode coupling apparatus comprising an optical waveguide which couples an optical signal propagating in the optical waveguide between propagation modes of the waveguide, the optical signal having an optical signal beat length for the modes, the waveguide (a) comprising a guiding structure formed of materials having dissimilar indices of refraction and (b) having perturbations optically induced by a perturbational light signal, the perturbations being spaced at intervals related to the beat length of the optical signal to cause cumulative coupling of said optical signal from one of the propagation modes to another.

19. The device defined by claim 18, wherein the optical waveguide has a non-circular cross section having cross-sectional dimensions selected such that the waveguide guides a portion of the perturbational signal in a fundamental spatial mode and another portion in a higher order spatial mode, the cross-sectional dimensions of the waveguide further selected such that the perturbational signal guided by the waveguide in the higher order mode propagates in only a single, stable intensity pattern.

20. The apparatus defined by claim 19, wherein the fundamental spatial mode includes two polarization modes, the cross-sectional dimensions of the core further selected to cause the polarization modes of the fundamental mode to be non-degenerate.

21. The apparatus defined by claim 20, wherein the single intensity pattern of the higher order spatial mode includes two polarization modes, the cross-sectional dimensions of the core further selected to cause these polarization modes to be non-degenerate.

22. The apparatus defined by claim 18, wherein the core of the waveguide has an elliptical cross section.

23. The device defined by claim 18, wherein the refractive index perturbations of said waveguide are produced by the optical Kerr effect.

24. The device defined by claim 18, wherein said propagation modes are first and second order spatial modes of the waveguide.

25. The device defined by claim 18, wherein the waveguide has a non-circular cross section.

26. A method of controlling an optical signal in an optical waveguide, comprising the steps of:
providing an optical waveguide having a geometry selected so that said optical waveguide supports at least first and second spatial propagation modes light propagating therein, said first and second spatial propagation modes having first and second effective refractive indices, respectively, such that light propagating in one of said first and second spatial propagation modes propagates at a phasevelocity that is different from the phase propagation velocity of light propagating in the other of said first and second spatial propagation modes;
inputting a first optical signal having a first wavelength into said optical waveguide so that said first optical signal propagates in said optical waveguide with substantially equal light intensities in said first and second spatial propagation modes in said waveguide, the light propagating in said first spatial propagation mode propagating at a phase velocity that is different from the phase propagation velocity of the light propagating in said second spatial propagation mode thereby causing an optical phase difference between the light propagating in said first spatial propagation mode and the light propagating in said second spatial propagation mode, said optical phase difference varying along the length of said optical waveguide;
inputting a second optical signal having a second wavelength into said optical waveguide to control said first optical signal, said second optical signal propagating in said optical waveguide in said first spatial propagation mode; and
selectively adjusting the intensity of said second optical signal so that said second optical signal has an intensity sufficiently large to perturb said first effective refractive index with respect to said second effective refractive index to change the ' phase velocity of the light of said first optical signal propagating in said first spatial propagation mode, thereby introducing an additional optical phase difference between the light propagating in said first spatial propagation mode and the light propagating in said second spatial propagation mode, said additional optical phase difference causing a change in the intensities in first and second lobes of an optical intensity distribution pattern at the output of said optical waveguide.

27. The method of controlling an optical signal in optical waveguide as defined in claim 26, further comprising the step of detecting said change in the intensities of said first and second lobes of said optical intensity distribution pattern in said output of said optical waveguide.

28. The method of controlling an optical signal in an optical waveguide as defined in claim 27, wherein said step of detecting said change in the intensity comprises the steps of:
directing the light from said first and second lobes of said optical intensity distribution pattern toward an optical detector;
selectively blocking one of said first and second lobes of said optical intensity distribution pattern so that the light reaching said optical detector comprises light from only the other of said first and second lobes; and
selectively filtering said light from said other of said first and second lobes so that light having said second wavelength is prevented from reaching said optical detector.

29. The method of controlling an optical signal, in an optical waveguide as defined in claim 26, further comprising the step of adjusting the length optical waveguide prior to said step of inputting said second optical signal into said optical waveguide so that substantially all of said light intensity is initially in one of said first and second lobes of said optical intensity distribution pattern.

30. The method of controlling an optical signal in an optical waveguide as defined in claim 29, wherein said step of selectively adjusting the intensity of said second optical signal comprises the step selecting an intensity of said second optical signal wherein substantially all of said light intensity at said first wavelength is in the other of said first and second lobes of said optical intensity distribution pattern.

* * * * *

UNITED STATES PATENT AND TRADEMARK OFFICE
CERTIFICATE OF CORRECTION

PATENT NO. : 4,895,421

DATED : January 23, 1990

INVENTOR(S) : Byoung Y. Kim, Hee G. Park, and Herbert J. Shaw

It is certified that error appears in the above-identified patent and that said Letters Patent is hereby corrected as shown below:

In Column 10, at line 26, change "$LP_{O1}$" to --$LP_{01}$--.

In Column 11, at line 45, change "$f_c=1.700(1+(b/a)^2)^{178}$" to --$f_c=1.700(1+(b/a)^2)^{½}$--.

In Column 17, at line 12, change "$LP01$" to --$LP_{01}$--.

In Column 18, at line 67, change "$LP!1$" to --$LP_{11}$--.

In Column 21, at line 38, change "$LP01$" to --$LP_{01}$--.

In Column 23, at line 66, change "$LPII$" to --$LP_{11}$--.

In Column 24, at line 36, change "input nd 410" to --input end 410--.

In Column 25, at line 49, change "$\pi 0$ phase" to --$\pi$ phase--.

In Column 26, at line 29, change "of has" to --of $\pi$ has--.

In Column 29, at line 59, change "a differential phase shift" to --a $\pi$ differential phase shift--.

In Column 31, at line 1, change "said tonal signal" to --said perturbational signal--.

In Column 32, at lines 39 and 40, change "as in claim 13" to --as defined in claim 13--.

In Column 32, at lines 47 and 48, change "as in claim 6" to --as defined in claim 6--.

In Column 33, at line 48, change "phasevelocity" to --phase velocity--.

UNITED STATES PATENT AND TRADEMARK OFFICE
CERTIFICATE OF CORRECTION

PATENT NO. : 4,895,421

DATED : January 23, 1990

INVENTOR(S) : Byoung Y. Kim, Hee G. Park, and Herbert J. Shaw

It is certified that error appears in the above-identified patent and that said Letters Patent is hereby corrected as shown below:

In column 34, at line 48, change "length optical" to --length of said optical--.

Signed and Sealed this

Twenty-second Day of September, 1992

Attest:

DOUGLAS B. COMER

*Attesting Officer*  *Acting Commissioner of Patents and Trademarks*